(12) United States Patent
Serwy

(10) Patent No.: US 12,406,014 B2
(45) Date of Patent: Sep. 2, 2025

(54) METHOD AND SYSTEM FOR GENERATING LOCATION INFORMATION FOR AN AREA

(71) Applicant: ROGDA L.L.C., Austin, TX (US)

(72) Inventor: Roger D. Serwy, Austin, TX (US)

(73) Assignee: ROGDA L.L.C., Austin, TX (US)

( * ) Notice: Subject to any disclaimer, the term of this patent is extended or adjusted under 35 U.S.C. 154(b) by 162 days.

(21) Appl. No.: 18/207,383

(22) Filed: Jun. 8, 2023

(65) Prior Publication Data

US 2023/0401270 A1     Dec. 14, 2023

Related U.S. Application Data

(60) Provisional application No. 63/351,633, filed on Jun. 13, 2022.

(51) Int. Cl.
| | |
|---|---|
| *G06F 16/9537* | (2019.01) |
| *G01C 21/00* | (2006.01) |
| *G06F 16/29* | (2019.01) |
| *G06F 40/40* | (2020.01) |

(52) U.S. Cl.
CPC ....... *G06F 16/9537* (2019.01); *G01C 21/387* (2020.08); *G06F 16/29* (2019.01); *G06F 40/40* (2020.01)

(58) Field of Classification Search
CPC ...... G06F 16/9537; G06F 16/29; G06F 40/40; G01C 21/387
See application file for complete search history.

(56) References Cited

U.S. PATENT DOCUMENTS

| | | | | |
|---|---|---|---|---|
| 6,466,696 | B1 * | 10/2002 | Politis | .............. G06T 7/12 |
| | | | | 375/240.03 |
| 6,606,584 | B1 * | 8/2003 | Junkins | ........... G06T 17/20 |
| | | | | 703/2 |
| 7,328,211 | B2 | 2/2008 | Bordner et al. | |
| 7,840,586 | B2 | 11/2010 | Hakala et al. | |
| 7,925,677 | B2 | 4/2011 | Sheridan | |

(Continued)

FOREIGN PATENT DOCUMENTS

| | | | |
|---|---|---|---|
| AU | 2015201799 B2 | 8/2016 | |
| BR | 102020000282 A2 | 7/2021 | |

(Continued)

OTHER PUBLICATIONS

Ao, Xiang et al.; Crossmodal Error Correction of Continuous Handwriting Recognition by Speech; https://dl.acm.org/doi/pdf/10.1145/1216295.1216339; https://sci-hub.mksa.top/10.1145/1216295.1216339; Jan. 28, 2007.

(Continued)

*Primary Examiner* — Gertrude Arthur Jeanglaude
(74) *Attorney, Agent, or Firm* — HULSEY P.C.

(57) ABSTRACT

A method and system for generating location information for an area are described. The present disclosure teaches to combine a method for progressively subdividing the earth into triangles or quadrilaterals to localize an area on map. Further, a chosen triangle indices is used to create a representation using a sequence of symbols or words from common speech. Using the representation and corresponding coordinates, location information is generated and provided to a user. This process enables easier sharing of location information in a human-friendly rather than machine-friendly manner.

16 Claims, 15 Drawing Sheets

(56) References Cited

U.S. PATENT DOCUMENTS

| | | | |
|---|---|---|---|
| 9,175,965 | B2 | 11/2015 | Inakoshi et al. |
| 9,418,152 | B2 | 8/2016 | Nissan et al. |
| 9,563,721 | B2 | 2/2017 | Anderson |
| 9,674,683 | B2 | 6/2017 | Hatton |
| 9,740,767 | B2 | 8/2017 | Quinion et al. |
| 9,797,328 | B2 | 10/2017 | Martinez et al. |
| 9,883,333 | B2 | 1/2018 | Ganesalingam et al. |
| 10,013,434 | B2 | 7/2018 | Sato |
| 10,095,808 | B2 | 10/2018 | Bodziony et al. |
| 10,380,210 | B1 | 8/2019 | Lai et al. |
| 10,380,248 | B1 | 8/2019 | Lai |
| 10,409,803 | B1 | 9/2019 | Lai |
| 10,909,318 | B2 | 2/2021 | Ganesalingam et al. |
| 2002/0035609 | A1* | 3/2002 | Lessard .............. G06F 16/9562 707/999.1 |
| 2002/0116123 | A1 | 8/2002 | Lampe et al. |
| 2004/0179006 | A1* | 9/2004 | Wardetzky .............. G06T 17/20 375/E7.084 |
| 2009/0096784 | A1* | 4/2009 | Wardetzky .............. G06T 17/20 345/420 |
| 2012/0284528 | A1 | 11/2012 | Orovitz |
| 2013/0297639 | A1 | 11/2013 | Bobik et al. |
| 2016/0350652 | A1 | 12/2016 | Min et al. |
| 2021/0183378 | A1 | 6/2021 | Gharpure et al. |

FOREIGN PATENT DOCUMENTS

| | | |
|---|---|---|
| CN | 104899254 A | 9/2015 |
| CN | 106302610 A | 1/2017 |
| CN | 107194744 A | 9/2017 |
| CN | 108009253 A | 5/2018 |
| CN | 105447160 B | 12/2018 |
| CN | 108932310 A | 12/2018 |
| CN | 109325089 A | 2/2019 |
| CN | 110807135 A | 2/2020 |
| CN | 111209447 A | 5/2020 |
| CN | 111323025 A | 6/2020 |
| CN | 111339230 A | 6/2020 |
| CN | 106980620 B | 7/2020 |
| CN | 111563080 A | 8/2020 |
| CN | 111563139 B | 10/2020 |
| CN | 111988746 A | 11/2020 |
| CN | 112347310 A | 2/2021 |
| CN | 112804645 A | 5/2021 |
| CN | 112818216 A | 5/2021 |
| CN | 111862162 B | 6/2021 |
| EP | 2507763 A4 | 2/2015 |
| EP | 2987344 A1 | 2/2016 |
| EP | 3243141 A1 | 11/2017 |
| EP | 3243142 A1 | 11/2017 |
| EP | 3701446 A1 | 9/2020 |
| JP | H09288495 A | 11/1997 |
| JP | 2020087150 A | 6/2020 |
| WO | WO2007/003721 | 1/2007 |

OTHER PUBLICATIONS

Banu, R.S.D. Wahida et al.; Using Selectional Restrictions for Real Word Error Correction; https://link.springer.com/chapter/10.1007/978-3-540-30176-9_17; https://sci-hub.mksa.top/10.1007/978-3-540-30176-9_17.

Bard, Gregory V.; Spelling-Error Tolerant, Order-Independent Pass-Phrases via the Damerau-Levenshtein String-Edit Distance Metric; https://dl.acm.org/doi/pdf/10.5555/1274531.1274545.

Dutton, Geoffrey, Zenithial Orthotriangular Projection, A useful if unesthetic polyhedral map projection to a peculiar plane; Spatial Effects.

Dutton, Geoffrey; Planetary Modelling via Hierarchical Tessellation; Prime Computer, Inc.

Geohash; Cycle Map; http://geohash.co/; https://github.com/davetroy/geohash-js.

Google; Google Plus Map Codes; https://maps.google.com/pluscodes/; https://www.placekey.io/blog/google-maps-plus-codes-location-keys; Apr. 11, 2021.

Hussein, Sari Haj; The Hush Cryptosystem; https://arxiv.org/pdf/1205.3021.pdf; May 14, 2012.

Jiang, Wen et al.; WHAT3WORDS Geocoding Extensions; https://sci-hub.se/https://link.springer.com/article/10.1007/s41651-018-0014-x; Feb. 15, 2018.

MAPCODE; https://www.mapcode.com/about; 2001.

.NET Microsoft Learn; How to use character encoding classes in .NET; https://docs.microsoft.com/en-us/dotnet/standard/base-types/character-encoding; Nov. 8, 2021.

Rubin, Frank; Experiments in Text File Compression; https://dl.acm.org/doi/pdf/10.1145/360363.360368; https://sci-hub.se/10.1145/360363.360368; Nov. 1, 1976.

Samatha et al.; Performance Improvement of MONCRYPT SSA Over Data Obfuscation in Cloud Security; https://www.ijeat.org/wp-content/uploads/papers/v9i2/B2916129219.pdf; Dec. 2019.

Snyder, John P.; An Equal-Area Map Projection for Polyhedral Globes; CARTOGRAPHICA, vol. 29, No. 1, Spring 1992, pp. 10-21.

Stefanakis, Emmanuel; Location Encoding Systems—Could Geographic Coordinates Be Replaced and at What Cost?; https://gogeomatics.ca/location-encoding-systems-could-geographic-coordinates-be-replaced-and-at-what-cost/; Mar. 11, 2016.

Transactions in GIS; Advances in Geocoding Research and Practice; https://sci-hub.se/https://onlinelibrary.wiley.com/doi/abs/10.1111/j.1467-9671.2011.01298.x; 2011.

Van Altena, Vincent et al.; Spatial Analysis of New Testament Textual Emendations Utilizing Confusion Distances; https://www.degruyter.com/document/doi/10.1515/opth-2019-0004/html; https://sci-hub.se/10.1515/opth-2019-0004; Mar. 11, 2019.

Van Snyder; Quaternary Triangular Mesh: A Hierarchical Coordinate System for Geoprocessing and Cartography; Jet Propulsion Laboratory; California Institute of Technology; Aug. 10, 2016.

Zandbergen, Paul A.; A Comparison of Address Point, Parcel and Street Geocoding Techniques; https://sci-hub.se/https://www.sciencedirect.com/science/article/pii/S0198971507000890?via%3Dihub; Jan. 11, 2007.

Zhou, Liangchen et al.; Efficient Encoding and Decoding Algorithm for Triangular Discrete Global Grid Based on Hybrid Transformation Strategy; Computer, Environment and Urban Systems; 2017.

\* cited by examiner 1110011010100000101100100001010100001 0 1 1 0 0

W D 8 2 S 1 A 2 S

↓

WD8.2s1.A2s

↓

WHISKEY DELDTA EIGHT . TWO SIERRA ONE . ALPHA TWO SIERRA

↓

COVER.SCHEDULE.ACCESS.DEFENSE

METHOD AND SYSTEM FOR GENERATING LOCATION INFORMATION FOR AN AREA

The present application claims the benefit of U.S. Provisional Application No. 63/351,633, filed Jun. 13, 2022; all of which is incorporated herein by reference.

BACKGROUND

Technical Field

Embodiments of the present disclosure generally relate to generating location information for a location in an area. In particular, embodiments of the present disclosure relate to a method and system for generating the location information by subdividing the area into sub-areas of triangles or quadrilaterals and generating the location information for each of the sub-areas.

Description of the Related Art

Map projection is the method of transferring the graticule of latitude and longitude on a plane surface. In the map projection, a globe's surface is flattened into a plane in order to make a map. This requires a systematic transformation of the latitudes and longitudes of locations from the surface of the globe into locations on a plane.

One such example of map projection is taught in a PCT application PCT/FR2005/001695, titled "METHOD AND SYSTEM FOR EARTH GLOBE MAP PROJECTION AND MAP OBTAINED BY SAID METHOD". In the PCT application '695, a map projection is disclosed to be performed using cylindrical projection. Various points of the surface of the globe are projected onto a cylinder, tangent or intersecting at this surface, and then the cylinder is developed to obtain a plane.

Existing techniques of map projections cause map distortions. The map distortions may be due to misrepresentation of shape, area, distance, or direction of or between geographic features when compared to their true measurements on the curved surface of the earth. Elimination of map distortion would require accurate projection of coordinates without mismatches.

Based on the projections, the plane may be segmented into multiple areas with respective coordinates. Each such area is identified using a representation. Most of the existing location-based systems use geometric numerical coordinates to identify a location's coordinates including latitude and longitude coordinates or grid references. However, such numerical coordinates used to identify locations may not be user-friendly. In practice, people generally find that strings of numbers are difficult to accurately remember or communicate verbally to others.

In some existing systems, locations are identified using other means such as postcodes or street names, possibly together with building numbers. However, such references may be used for all kinds of locations. Such references may work well in urban areas where a high density of suitable codes, names, and numbers have been assigned but fails in areas where a single PIN code or reference may be used by many.

Alternatively, some of the existing systems teach to generate code names, comprising sequences of words, for a specific location. Such code names may be easily read and communicated by a user.

A U.S. Pat. No. 9,883,333 B2 titled "METHOD AND APPARATUS FOR IDENTIFYING AND COMMUNICATING LOCATIONS" teaches the projection of coordinates onto grid references and naming each of the grid references using a sequence of words.

However, the sequence of words is again a general mapping of numbers into words and hence is generic in nature. It may be hard for users to use these sequences of words. Therefore, there is a need for systems and methods for generating location information that is easy to refer to and use in general communication.

The information disclosed in this background of the disclosure section is only for enhancement of understanding of the general background of the disclosure and should not be taken as an acknowledgement or any form of suggestion that this information forms existing information already known to a person skilled in the art.

BRIEF SUMMARY

One or more embodiments are directed to a method, a system, and a non-transitory computer-readable medium for generating uniquely identifiable location information in form of a user-friendly combination of words. In an embodiment, to generate unique identifiable location information, a 2D representation of a map of the Earth is progressively divided with triangles or quadrilaterals to localize an area on a map. Two-dimensional (2D) mapping is performed using a 2D-bisection search and a chosen triangle/quadrilateral index is used to create a representation using a sequence of symbols or words from common speech. Using the representation and corresponding coordinates, location information is generated and provided to a user. This process enables easier sharing of location information in a human-friendly manner rather than a machine-friendly manner.

An embodiment of the present disclosure discloses a system for creating uniquely identifiable location information of an area of the earth. The system creates an octahedron representation of a sphere-shaped map of the earth and converts the octahedron representation into a set of triangles in a two-dimensional (2D) plane, wherein a first vertex of a first subset of triangles of the set of triangles represents the northernmost point of the earth, a second vertex of a second subset of triangles of the set of triangles represents the southernmost point of the earth and one line of each of triangle of the set of triangles are along the equator. Once the map is represented in the form of the set of triangles, the system applies appropriate skew to preserve its area. The system skews the set of triangles clockwise to form a plurality of 2D parallelograms (e.g., four parallelograms), wherein the first vertex of the first subset of triangles is skewed toward the east and the second vertex of the second subset of triangles is skewed toward the west. These parallelograms allow for 2D binary or bisection search, which typically alternate between the vertical and horizontal axes.

The system subdivides areas of the 2D parallelograms recursively into $2^n$ area subdivisions (e.g., n=45) by subdividing along either vertical or horizontal directions and altering the dimension at each recursive step. At certain positions, the bisection search is modified, where subdivisions are created by selectively performing either a vertical subdivision or a horizontal subdivision twice in succession depending on a relative position of a subdivision from a decision boundary, followed by its complement twice to overcome potential side-imbalance. The decision boundary may be a diagonal line across each of the 2D parallelograms. In an embodiment, the vertical subdivision is performed twice in succession when a subdivision from a previous step is above the decision boundary and above a horizontal line across the equator, and horizontal subdivision is performed twice in success when a subdivision from a previous step is below the horizontal line. Depending on the required resolution, the value of n can be changed.

Once the subdivisions are created, the system represents each of the $2^n$ area subdivisions as an n-bit sequence, wherein each bit of the n-bit sequence represents the direction of alternating horizontal subdivisions and vertical subdivisions used to generate a specific subdivision. The system splits each of the n-bit sequence (e.g. 45-bit sequence) representations of each of the $2^n$ area subdivisions into a plurality of tuples, wherein each of the plurality of tuples is m-bit of the n-bit sequence (e.g. 9 bits sequence), and associates a commonly used word with each of the tuples. The mapping of each of the 9-bit sequence representations with a commonly used word is stored in a memory connected with one or more computing devices. The system creates uniquely identifiable location information in the form combination of two or more words comprising the associated commonly used word. This uniquely identifiable location information is in form of a combination of two or more words and is used to enable the area of the earth to be searched by a user through a user device.

In an embodiment, the commonly used word to be associated with each of the plurality of tuples is selected from commonly used words in the area by common users. The system may choose the commonly used word from a set of preconfigured words. In an embodiment, the word selected to map with each tuple can be a commonly used word in the area that the corresponding subdivision represents. The commonly used word is selected from a set of 2n preconfigured words. The n may be any integer number such as 4, 5, 6, 7, 8, 9, 10, 11, and 12, depending on the required resolution of the map. For selecting the words, the method may use an edit distance metric of dictionary words or locally used words.

The features and advantages of the subject matter hereof will become more apparent in light of the following detailed description of selected embodiments, as illustrated in the accompanying FIGUREs. As one of ordinary skill in the art will realize, the subject matter disclosed is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIGS. 10, 11, 12, 13, and 14 show embodiments for generating location information for an area, in accordance with an embodiment of the present disclosure.

DETAILED DESCRIPTION

Figure 1:
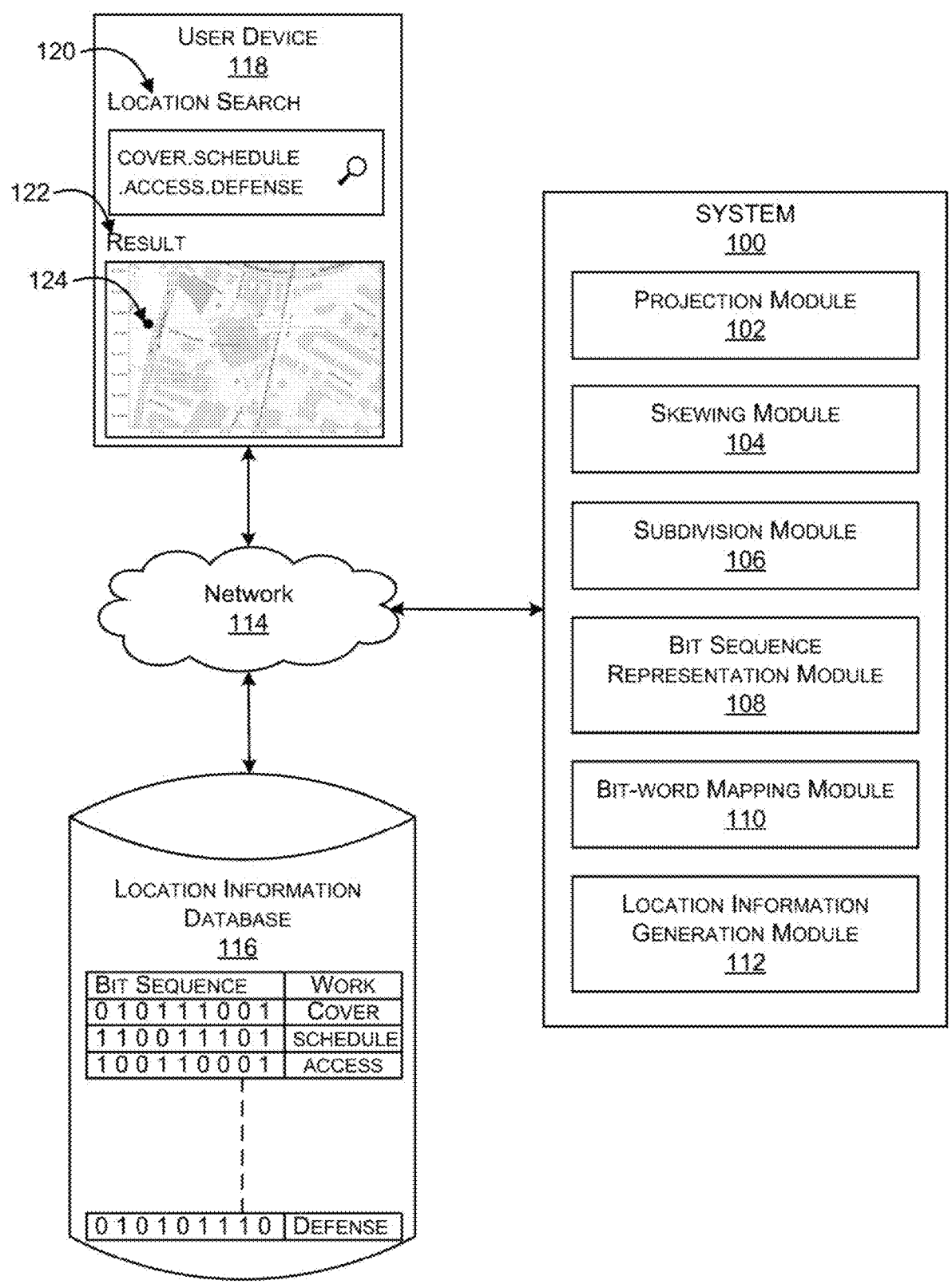
FIG. 1 illustrates an exemplary environment of a system for generating location information for an area and using the location information to search the area, in accordance with an embodiment of the present disclosure.

The detailed description set forth below in connection with the appended drawings is intended as a description of exemplary embodiments in which the presently disclosed process can be performed. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be performed without these specific details. In some instances, well-known structures and devices are shown in block diagram form in order to avoid obscuring the concepts of the presently disclosed method and system.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, semiconductor memories, such as ROMs, PROMs, random access memories (RAMs), programmable read-only memories (PROMs), erasable PROMs (EPROMs), electrically erasable PROMs (EEPROMs), flash memory or other types of media/machine-readable medium suitable for storing electronic instructions (e.g., computer programming code, such as software or firmware).

Various methods described herein may be performed by combining one or more machine-readable storage media containing the code according to the present disclosure with appropriate standard computer hardware to execute the code contained therein. An apparatus for performing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

FIG. 1 illustrates an exemplary environment of system 100 for generating location information for an area and using the location information to search the area, in accordance with an embodiment of the present disclosure. In an embodiment, the system 100 may be part of a navigation system used for generating the location information as a set of words and enabling searching of a location using the set of words. The system 100 includes a projection module 102, a skewing module 104, a subdivision module 106, a bit sequence representation module 108, a bit-word mapping module 110, and a location information generation module 112. The projection module 102 creates an octahedron representation of a sphere-shaped map of the earth and converts the octahedron representation into a set of triangles in a two-dimensional (2D) plane. The set of triangles is created in such a way that a first vertex of a first subset of triangles of the set of triangles represents the northernmost point of the earth, a second vertex of a second subset of triangles of the set of triangles represents the southernmost point of the earth and one line of each of triangle of the set of triangles is along the equator. Once the map is represented in the form of a set of triangles, the projection module 102 applies appropriate skew to preserve its area. The skewing module 104 skews the set of triangles clockwise to form a plurality of 2D parallelograms (e.g., four parallelograms), wherein the first vertex of the first subset of triangles is skewed toward the east and the second vertex of the second subset of triangles is skewed toward the west. These parallelograms allow for 2D binary or bisection search, which typically alternate between the vertical and horizontal axes.

The subdivision module 106 subdivides areas of the 2D parallelograms recursively into $2^n$ area subdivisions (e.g., n=45) by sub-dividing along either vertical or horizontal directions and altering the dimension at each recursive step. At certain positions, the bisection search is modified, where subdivisions are created by selectively performing either a vertical subdivision or a horizontal subdivision twice in succession depending on a relative position of a subdivision from a decision boundary, followed by its complement twice to overcome potential side-imbalance. The decision boundary may be a diagonal line across each of the 2D parallelograms. In an embodiment, the vertical subdivision is performed twice in succession when a subdivision from a previous step is above the decision boundary and above a horizontal line across the equator, and horizontal subdivision is performed twice in success when a subdivision from a previous step is below the horizontal line. Depending on the required resolution, the value of n can be changed.

Once the subdivisions are created, the bit sequence representation module 108 represents each of the $2^n$ area subdivisions as an n-bit sequence, wherein each bit of the n-bit sequence represents the direction of alternating horizontal subdivisions and vertical subdivisions used to generate a specific subdivision. The bit-word mapping module 110 splits each of the n-bit sequence representations of each of the $2^n$ area subdivisions into a plurality of tuples, wherein each of the plurality of tuples is m-bit of the n-bit sequence (e.g., 9 bits sequence), and associates a commonly used word with each of the tuples. The mapping of each of the 9-bit sequence representations with a commonly used word is stored in a memory connected with one or more computing devices. The location information generation module 112 creates uniquely identifiable location information in the form combination of two or more words including the associated commonly used word. This uniquely identifiable location information, in form of a combination of two or more words, is used to enable the area of the earth to be searched by a user through a user device 118 connected to the system 100 through a network 114. The commonly used word to be associated with each of the plurality of tuples is selected from commonly used words in the area by common users. The bit-word mapping module 110 may choose the commonly used word from a set of preconfigured words.

The system 100 may store a mapping of the bit-sequence to word in a location information database 116. A user can enter location search by typing or speaking location information, which may be a combination of words separated by a special character (e.g., ".") using the location search interface 120 of the user device 118. The system 100 may be used to process the search to return the exact location corresponding to the location information on the map. The location information (e.g., Cover.schedule.access.defense) is converted into bit-sequence using the mapping table maintained by the location information database 116. The bit sequence is then used to perform a bisection search to locate the exact subdivision corresponding to location 124 on the map.

In an embodiment, the exemplary environment may be a satellite-based location system which is used in multiple applications for navigation. In an embodiment, the system 100 may be triggered to dynamically generate the location information upon receiving a request from a user for a specific area or location. In an embodiment, the system 100 may generate multiple location information for locations covering areas of the complete earth. Such multiple location information may be stored for the locations. When a request for location information of a specific location is received, the system 100 may use the stored location information to help a user locate the location on the map.

The system 100 may include one or more processors, an Input/Output (I/O) interface, one or more modules, and memory. In some non-limiting embodiments or aspects, the memory may be communicatively coupled to one or more processors. The memory stores instructions, executable by one or more processors, which on execution, may cause the system 100 to generate the location information. In some non-limiting embodiments or aspects, the memory may include data (not shown in the Figure). One or more modules may perform the steps of the present disclosure using the data to generate the location information. In some non-limiting embodiments or aspects, each of one or more modules may be a hardware unit, which may be outside the memory and coupled with the system 100.

In some non-limiting embodiments or aspects, the data in memory may be processed by one or more modules of the system 100. In some non-limiting embodiments or aspects, one or more modules may be implemented as dedicated units and when implemented in such a manner, one or more modules are configurable with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. One or more modules of the present disclosure function to generate the location information for an area or a location. One or more modules along with the data, may be implemented in any system for generating the location information. In a non-limiting embodiment, at least one of the one or more modules may be implemented independently as a cloud-based server performs its respective functionality. Such at least one module may be communicatively coupled with the system 100 via a communication network.

Figure 2:
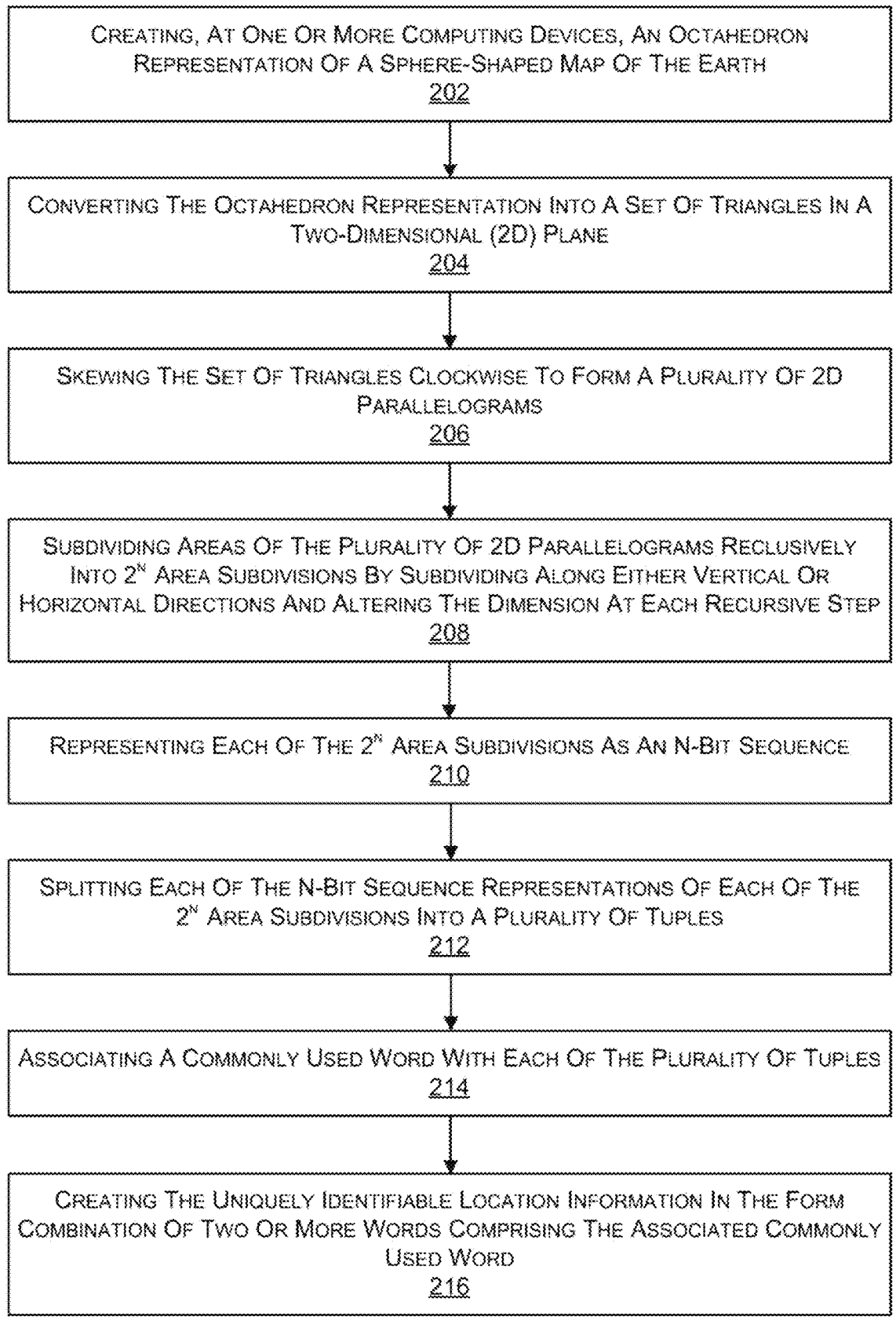
FIG. 2 shows a flow diagram illustrating a method for generating location information for an area, in accordance with an embodiment of the present disclosure.

FIG. 2 shows a flow diagram illustrating a method for generating the location information for the area, in accordance with an embodiment of the present disclosure. The method includes steps of creating an octahedron representation of a sphere-shaped map of the earth, as shown at block 202, converting the octahedron representation into a set of triangles in a two-dimensional (2D) plane, as shown at block 204, skewing the set of triangles clockwise to form a plurality of 2D parallelograms, as shown at block 206, subdividing areas of the plurality of 2D parallelograms recursively into $2^n$ area subdivisions by sub-dividing along either vertical or horizontal directions and altering the dimension at each recursive step, as shown at block 208, representing each of the $2^n$ area subdivisions as an n-bit sequence, as shown at block 210, splitting each of the n-bit sequence representations of each of the $2^n$ area subdivisions into a plurality of tuples, as shown at block 212, associating a commonly used word with each of the plurality of tuples, as shown at block 214, and creating the uniquely identifiable location information in the form combination of two or more words comprising the associated commonly used word, as shown at block 216. In an embodiment, the octahedron representation is converted into a set of triangles in a two-dimensional (2D) plane such that a first vertex of a first subset of triangles of the set of triangles represents the northernmost point of the earth, a second vertex of a second subset of triangles of the set of triangles represents the southernmost point of the earth and one line of each of triangle of the set of triangles is along the equator. In an embodiment, the set of triangles are skewed clockwise to form a plurality of 2D parallelograms, wherein the first vertex of the first subset of triangles is skewed toward the east and the second vertex of the second subset of triangles is skewed toward the west. In an embodiment, the method selectively divides either a vertical subdivision or a horizontal subdivision twice in succession depending on a relative position of a subdivision from a decision boundary, followed by its complement twice to overcome potential side imbalance. The decision boundary may be a diagonal line across each of the 2D parallelograms. In an embodiment, the vertical subdivision is performed twice in succession when a subdivision from a previous step is above the decision boundary and above a horizontal line across the equator, and horizontal subdivision is performed twice in success when a subdivision from a previous step is below the horizontal line. Once the map is divided into subdivisions of the required resolution, each of the subdivisions, which may be a triangle or square, may be represented by an n-bit sequence. Each of the n-bit sequences represents the direction of alternating horizontal and vertical subdivisions. These n-bit sequences can be used to accurately locate the corresponding triangle during the search. For ease of referencing, this n-bit binary sequence also referred to as bitstreams can be split into k number of tuples of m bit each. For example, a 45-bit sequence can be split into five tuples of 9 bits each. Further, each of these 9 bits can be mapped to a unique word. The method may use phonetic spatial and other similar spatial to keep distance between confusingly similar words while mapping the 9 bits tuples to words. Once each of the k tuples is mapped with a corresponding word, the full n-bit sequence can be represented as a sequence of words. These quested words can be used as location information. For example, the 45 bit sequence can be represented by 5 words. These mapped words are maintained in a database 116 for decoding the bit steam when a search query containing location information in form of a sequence of words is received. The decision boundary is a diagonal line across each of the plurality of 2D parallelograms.

In an embodiment, the word selected to map with each tuple can be a commonly used word in the area that the corresponding subdivision represents. The commonly used word is selected from a set of $2^n$ preconfigured words. The n may be any integer number such as 4, 5, 6, 7, 8, 9, 10, 11, and 12, depending on the required resolution of the map. For selecting the words, the method may use an edit distance metric of dictionary words or locally used words.

Figure 3:
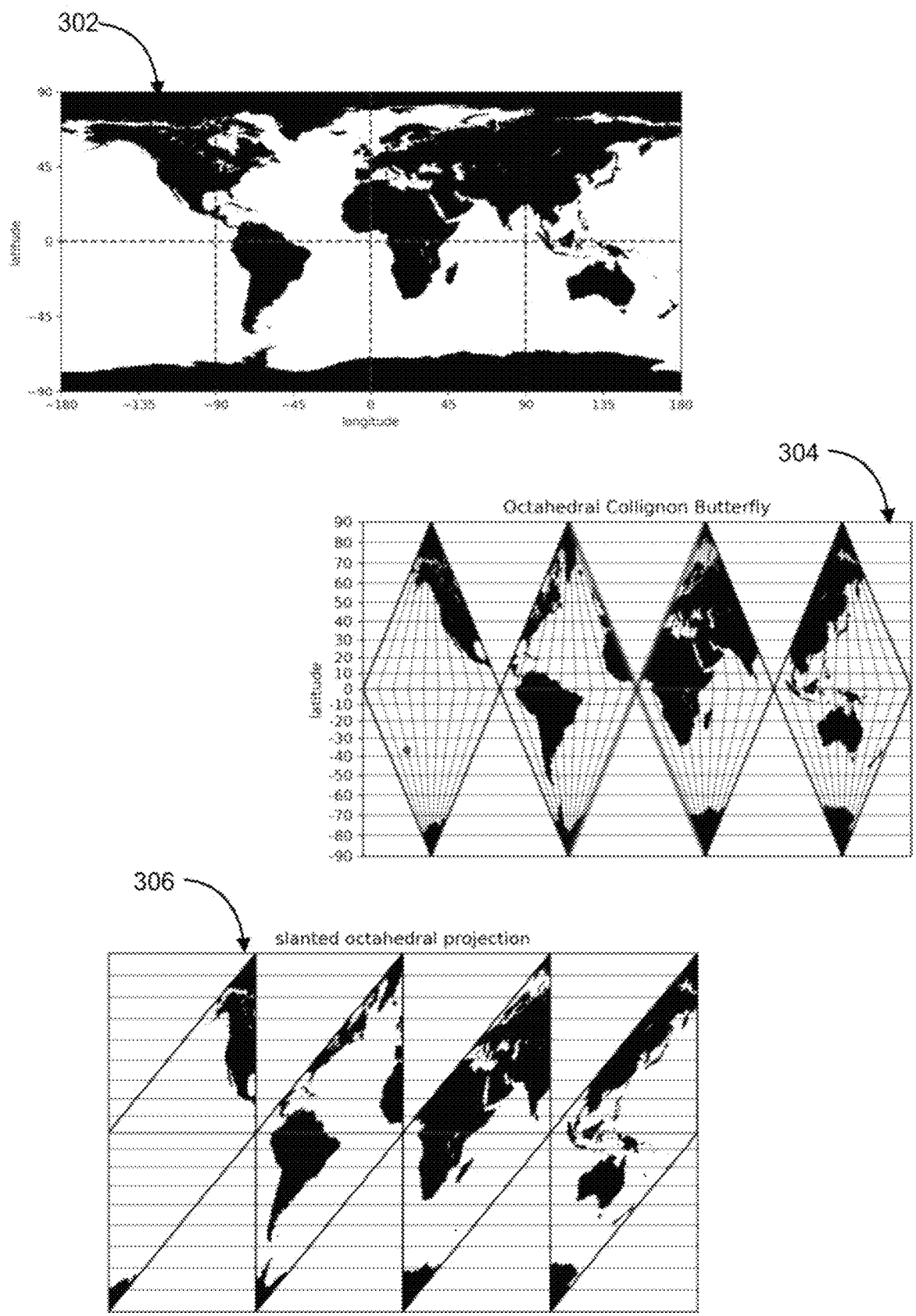
FIG. 3 shows a representation differentiating conventional map projection, triangular map projection, and slanted octahedral map projection, in accordance with an embodiment of the present disclosure.

In an embodiment, at block 202, the projection module 102 performs map projection on the triangles. FIG. 3 shows a representation of different conventional map projections, triangular map projections as created by the projection module 102, and skewed (also referred to as slanted) octahedral projections as created by the skewing module 104, in accordance with an embodiment of the present disclosure.

The familiar equirectangular projection of the earth is shown as the first map projection 302. In such projection, lines of latitude and longitude form a regular grid. The poles, which each represent a point on a sphere, now stretch to become the upper and lower boundaries of the projection.

The projection module 102 performs the projection, which is a modified Collignon projection, shown as a second map projection 304. The second map projection 304 is an equal-area projection of the sphere onto an octahedron, a shape with 8 sides. The north and south poles exist as points on the top/bottom of the triangles rather than a line as with the equirectangular projection. The equal-area projection i.e., the second map projection 304 does not have equally spaced lines of latitude. The second map projection 304 could be cut, folded, and taped to recreate an octahedron.

In an embodiment, the projection module 102 converts the eight 90×90 degree squares in the equirectangular projection into eight equilateral triangles. The area distortions are reduced, where the projection has equal-area, but distorts great-circle distances. Once the map is rendered on a 2d plane, in a triangle, the skewing module 104 applies an appropriate skew to each triangle to preserve its respective area.

The projection module 102 converts latitude/longitude coordinates to a position on a triangle using one or more ways. The projection module 102 projects the surface of the earth to a polyhedron which can be unfolded. The Dymaxion Map is a famous example of such a projection, using an icosahedron. Although the embodiments of the present disclosure are explained using octahedron projection, other three-dimensional geometry can be used for projecting the map and subdividing it using the other modules on the proposed system.

For mapping latitude/longitude to the initial octahedron side, the latitude/longitude coordinates lend themselves to the octahedron. The latitude is bound to [−90, 90] and the longitude is bound to [−180, 180]. In an embodiment, a 2D bisection search is implemented for the 2D mapping of data. There are eight triangles which map easily to these coordinates. Identifying the containing triangle is straightforward, and the "relative" latitude/longitude is a translation to the local triangle. The relative latitude/longitude is then bound between [0, 90] and [0, 90]. These "relative" coordinates are the angles mod 90. The projection performed by the projection module 102 preserves area. Further, this transformation distorts linear distance.

In an embodiment, a variation of the octahedral projection is disclosed as a third map projection 306 in FIG. 3. In the third map projection 306, the northern hemisphere triangles (also referred to as a first subset of triangles) skew toward the east, and the southern hemisphere triangles (referred to as a second subset of triangles) skew towards the west. This skew/slanted projection (alternatively referred to as interchangeably) can be thought of as having four diamonds (also referred to as parallelograms) rather than 8 triangles. This diamond configuration allows for a 2D binary/bisection search, which typically alternates between the vertical and horizontal axes. In an embodiment, an additional skewing step can be taken, shifting the lower left side of the diamond northward, to make the diamond a square.

At block 206, the subdivision module 106 may divide an area of earth into sub-areas of triangles or quadrilaterals. For example, the world may be subdivided into $2^{45}$ triangles which is approximately equal to 35 trillion triangles. Each triangle has an area of approximately 14.5 m2, which can localize any latitude/longitude coordinate to within 2.15 meters on average. The latitude/longitude coordinates may be received as coordinates information by the system 100. The surface area of the earth is:

$$A_{earth}=510,067,420,000,000 \text{ m}^2 \qquad (1)$$

In an embodiment, the subdivision algorithm implemented in the subdivision module 106 is recursive/iterative and this is scalable to lesser and greater resolution.

The angles of a planar triangle sum to 180 degrees. For a spherical triangle, its internal angles always sum to greater than 180 degrees. The surface area of a unit sphere is $4\pi$.

The surface area of a triangle is the summation of its angles in radians, minus $\pi$, which is also known as its spherical excess. An immediate example is the 90-90-90 triangle formed by the triangle by connecting the latitude/longitude points with great circle arcs: (0, 0), (90, 0), (90, 0). The spherical excess is 270−180=90 degrees, which is $$\frac{\pi}{2} = \frac{4\pi}{8},$$

which is ⅛th area of the earth, as expected.

Figure 4:
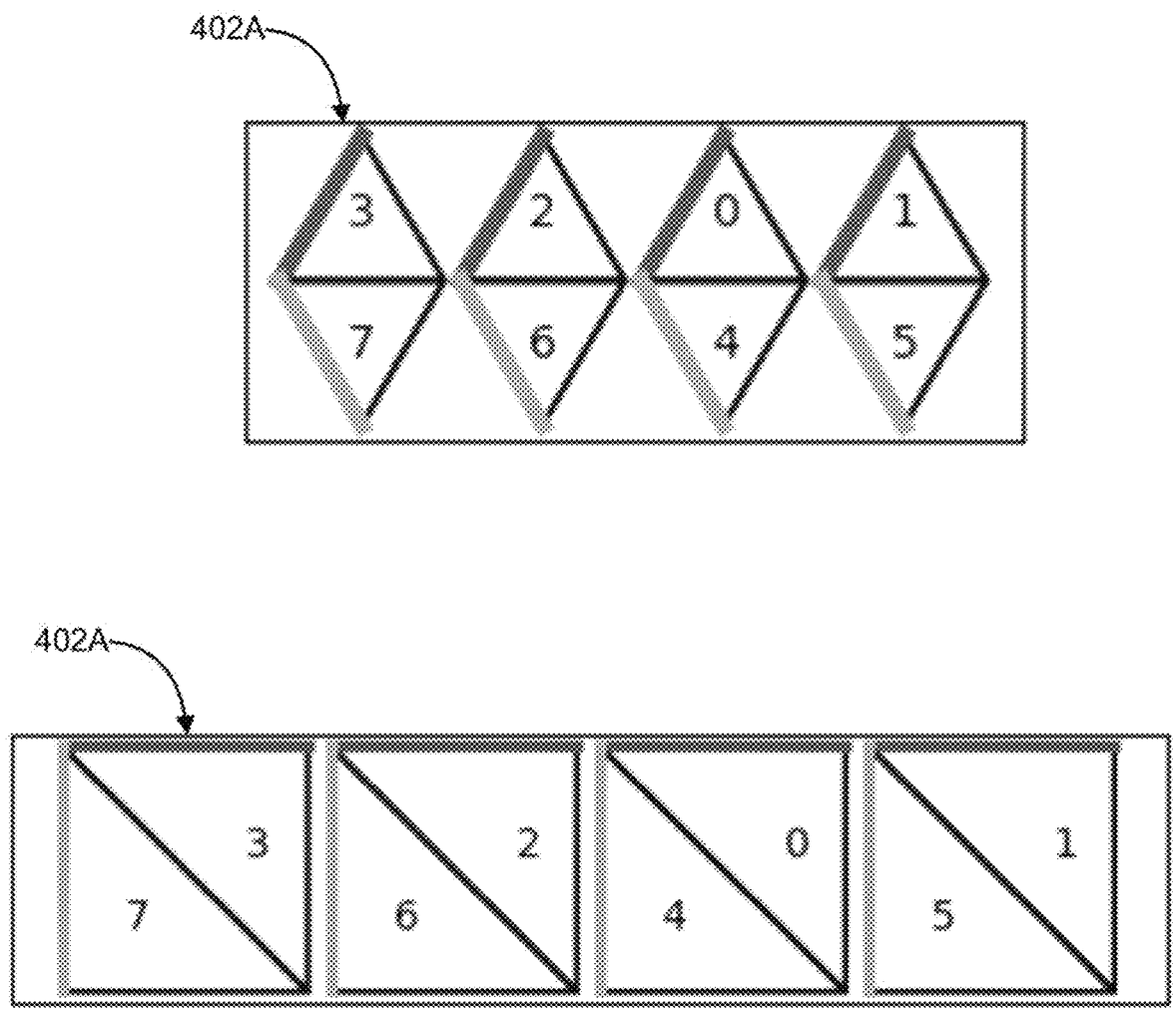
FIG. 4 shows representations illustrating subdividing of an area, in accordance with an embodiment of the present disclosure.
Figure 5:
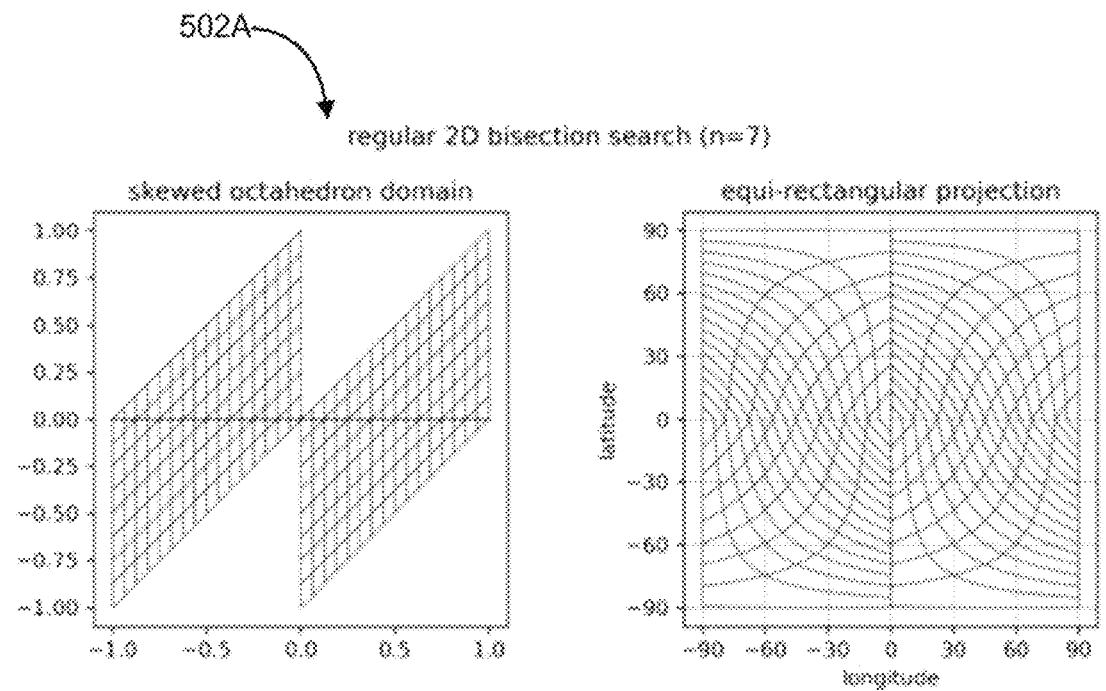
FIG. 5 shows embodiments illustrating regular and side-balanced 2D bisection search, in accordance with an embodiment of the present disclosure.
Figure 5:
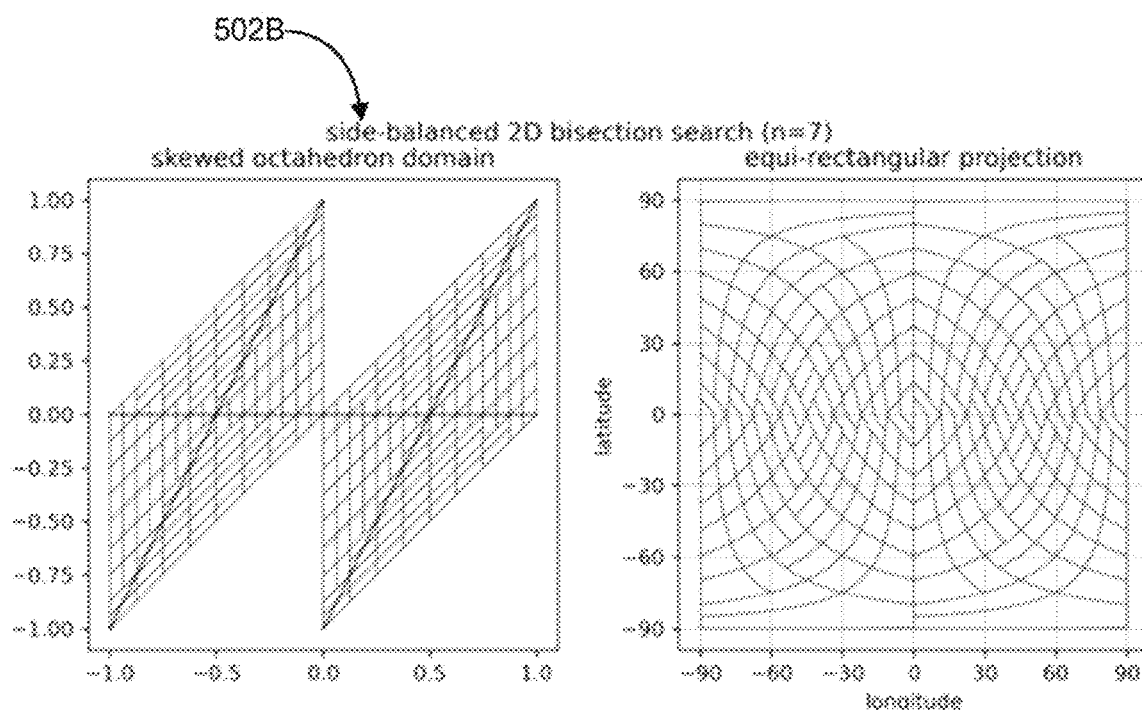

Once the latitude and longitude coordinates are mapped to a planar triangle, useful 2D geometry properties become available. Further, shearing a planar polygon preserves its area. The adjacent north/south triangles can be sheared to form a square. In FIG. 4, eight octahedral sides in 402A are sheared to form four squares as in 402B. Once a square is formed, 2D bisection search can be employed to isolate a given point. Pattern 502A shown in FIG. 5 shows a 2D bisection search that may be plotted when a directly alternating bisection search is implemented where the alternating horizontal/vertical divide-by-two may be represented using a bit for each step. It shows all the possible subdivisions of the bisection search, alternating between bisecting the up/down and left/right. There are 8 divisions along the vertical and 16 divisions along the diagonal. This is a large division imbalance since the upper right diagonal and the upper left line represent the same line of longitude. The bottom panel shows this imbalance when projected back to the equirectangular coordinates.

Figure 6:
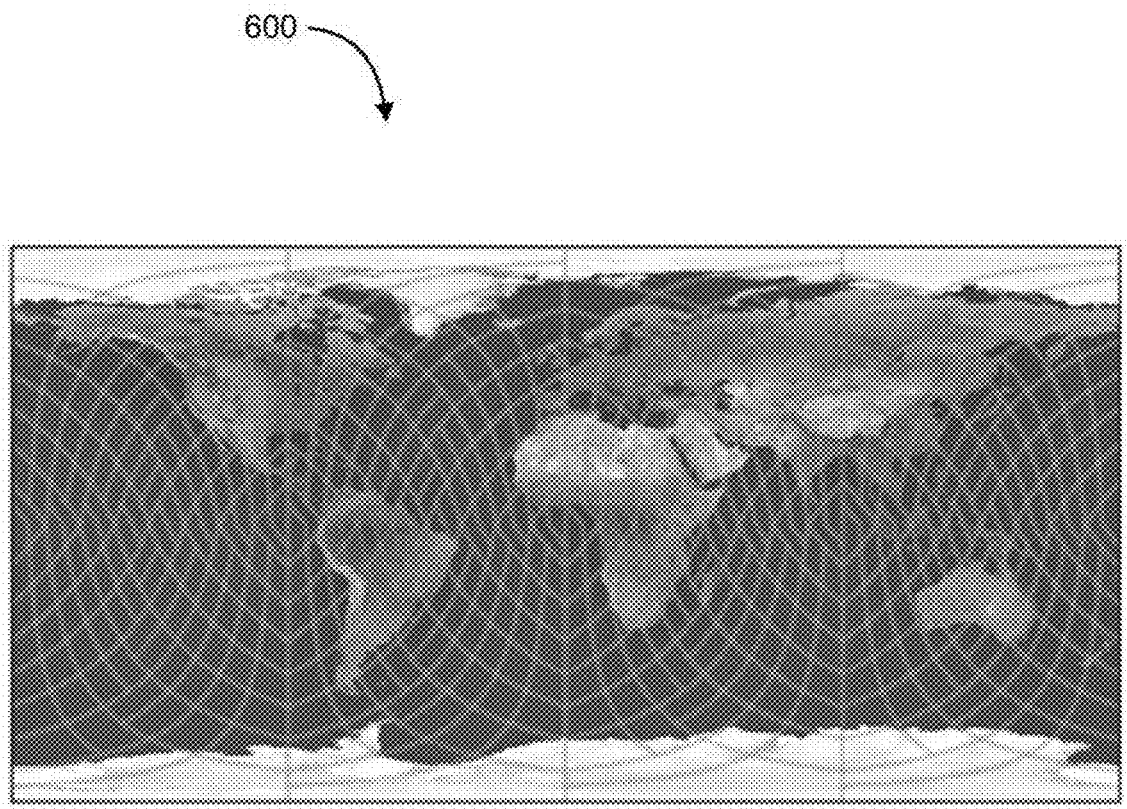
FIG. 6 shows side-balanced bisection regions on a map of the Earth, in accordance with an embodiment of the present disclosure.

The subdivision module 106 selectively performs either a vertical or horizontal subdivision twice in succession, followed by its complement twice. Pattern 502B shows a modified 2D bisection search, where the up/down bisection is doubly applied at certain steps and left/right is immediately doubly applied afterwards to return to regular behavior. The diagonal line in the pattern of the skewed octahedron domain shows the decision boundary, where if the region is above it and above y=0, then the subdivision module 106 doubly applies up/down, and is similarly reflected when the boundary is below y=0. The resulting bisection has 9 subdivisions along each edge. There is a mismatch at approximately +/−84.9 degrees latitude, as well as at +/−6.9 degrees. These mismatches are acceptable, as they occur in water or low population-density land areas. FIG. 6 shows the side-balanced bisection regions on map 600 of the Earth. There are 512 regions, where each of the four 90-degree longitude panels has 128 regions. There are 9 bits used to encode this first region (2 for the panel, 7 for the bisection). In a slight alteration to the algorithm, the mismatches at 84.9 and 6.9 degrees can be eliminated by having mirror symmetry. Further, this approach ensures that the boundaries of the square have an equal number of divisions (not necessarily equal-length). The resulting subdivisions are necessarily quadrilateral. It can become a triangle if the division is across its diagonal instead and the choice of diagonal is important. The resulting triangle will have the same boundary as if it were done using triangular subdivisions. The advantage of using the square subdivisions comes from the separation of points that share a common bit suffix. For example, 45 bits can be used to specify either a quadrilateral or triangle boundary on the Earth. The use of quadrilaterals instead of triangles has a very useful property of maximizing the distance between bit sequences with common suffixes. For example, for a given 45-bit sequence, the first 9 bits can be substituted with each of the possible 512 values. This set of 512 points would be spaced approximately as far apart as possible.

Figure 7:
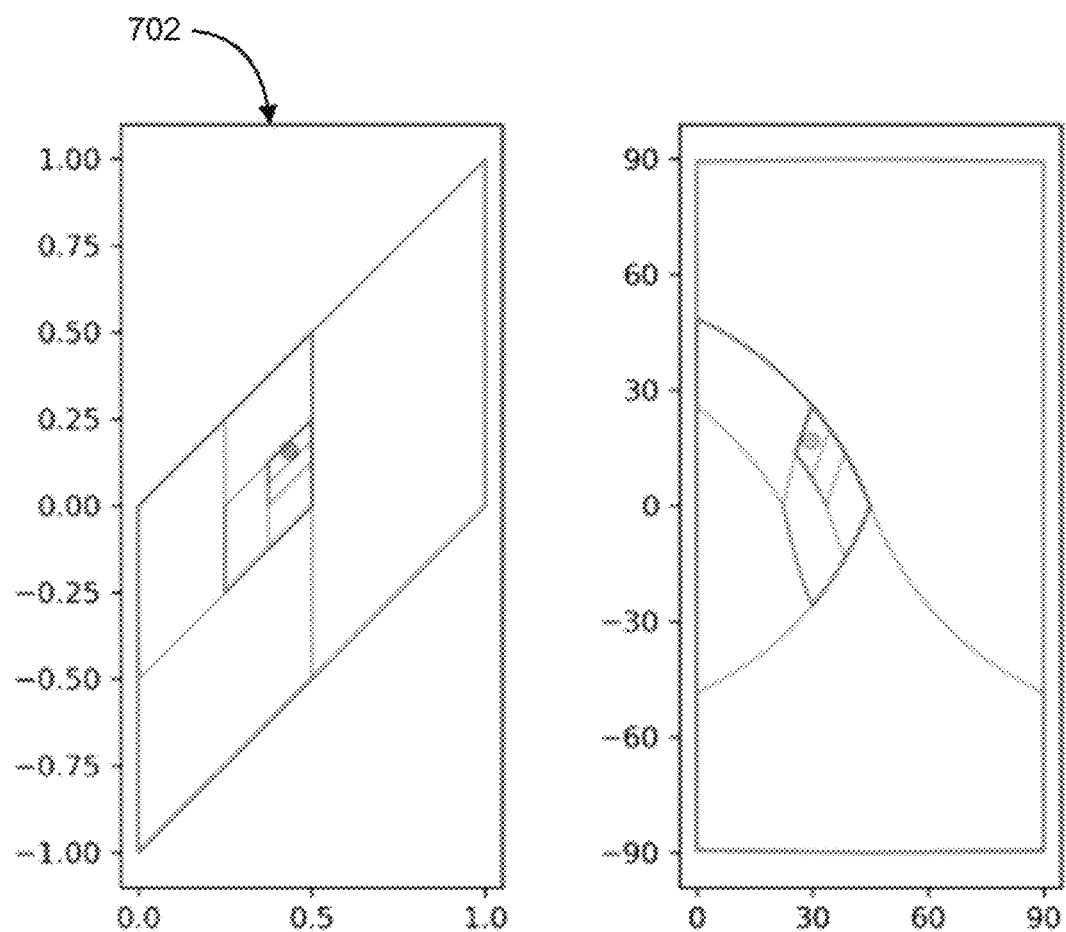
FIG. 7 shows an example of localizing a point with the side-balanced bisection search algorithm, in accordance with an embodiment of the present disclosure.

FIG. 7 shows an example 702 of localizing a point with the side-balanced bisection search algorithm. The left panel is the diamond quadrilateral, and the right panel shows the equivalent boundaries projected to the equirectangular domain. The search starts with drawing a dividing line between the left/right sides, then a slanted line between the upside/downside, and alternates. Notice that the final two steps doubly-applies bisection in the up/down direction. The 7 steps as shown are:

Left, Up, Right, Down, Right, Up, Up.

The algorithm for the side-balanced bisection search follows the standard 2D bisection search that alternates the axis of bisection, but at certain steps, it can repeat the previous bisection axis rather than switching, depending on the location of bounding quadrilateral. The other, complement axis is then taken for the next two steps. The purpose of this modified bisection axis is to maximize the equivalent distance (on the sphere) between the center of the nearest region that shares a common suffix of encoding bits when the prefix encoding bits change.

For example, for a region encoded with 45 bits, the nearest region from the set of all 511 regions with different leading 9 bits should be maximally distant from the original region.

In other embodiments of the 2D bisection search, the bisection axis sequence is not required to alternate. For example, 6 steps that alternate horizontal (H) and vertical (V) axes that follow an alternating axis bisection sequence H V H V H V can follow H H H V V V and still isolate the identical region, though the bit encoding may be different. The axis orientation sequence can still allow for modifications to ensure maximum distance from adjacent regions with common suffixes for certain steps in the bisection sequence, for example, the 7th or 25th steps.

An example Python3 code is shown, given a sequence of encoding bits, derives the bounding quadrilateral, starting from a diamond and progressively bisecting it, choosing the up/down/left/right sub-quadrilateral depending on the current step in the decoding process and the location of the current quadrilateral.

```
...
def compute_bounds_decode(bits):
    # diamond start shape, 4 (x, y) corners of a diamond
    q = [(0, -1), (0, 0), (1, 1), (1, 0)]
    a_chosen = 0 # counter
    b_chosen = 0 # counter
    for bit_index, bit in enumerate(bits): #iterate over the bits
        # choose 'a' if it is behind or equal to 'b'
        choose_type_a = (a_chosen <= b_chosen)
        x,y=mid_point(q) #find the midpoint of the quadrilateral
        if (bit_index in (6, 24, 42)):
            if((y>0)and(2*x-y<=1))or((y<0)and(2*x-y>=1)):
                choose_type_a = False
                bit=1-bit #invert bit to swap the chosen bisection
        if choose_type_a:
            a_chosen += 1
            ql, qr = bisect_lr(q) #split quad into left/right
            if bit == 0: q_choice = ql
            else: q_choice = qr
        else: #type b
            b_chosen += 1
            qd, qu = bisect_du(q) #split quad into down/up
            if bit == 0: q_choice = qd
            else: q_choice = qu
        # The new bounding quad is 'q_choice'
        q = q_choice
    return q
...
```

There are counters 'a_chosen' and 'b_chosen' that increment if the bisection orientation is taken. Choosing bisection axis "a" depends on if it has been chosen less often than (or the same as) "b". Bisection axis "A" can be purposefully not chosen if the current iteration and the current quadrilateral satisfy certain conditions, causing bisection axis "B" to be taken again.

The pattern 502B in FIG. 5, with $0<=x<=1$ and $-1<=y<=1$, shows the effects of bisection after 7 steps. There are 128 unique regions, with 64 regions oriented predominantly vertical and 64 regions oriented predominantly diagonal.

A bit selects from a set of two possible sub-quadrilateral bisections. The meaning of the bit can also change depending on the step (bit index) and quadrilateral location. For example, the sub-quadrilateral bisections can be swapped, so that a bit=0 chooses the right instead of the left (or up instead of down). This change in interpreting the bit can modify the distance of the nearest neighbor. In a more specific example, the swap can be implemented when the choice of bisection axis is changed by satisfying certain step and location conditions.

The algorithm applies this decision at steps 6, 24, and 42 of the bisection search. They correspond to bits 8, 26, and 44 of the bisection when counting the first bit from zero. The first two bits choose which of the four diamonds to start. Making the additional doubling decision at these points of the subdivision process ensures good alignment with groups of 9 bits, ensuring common suffixes are maximally separated (more on separation later).

Figure 8:
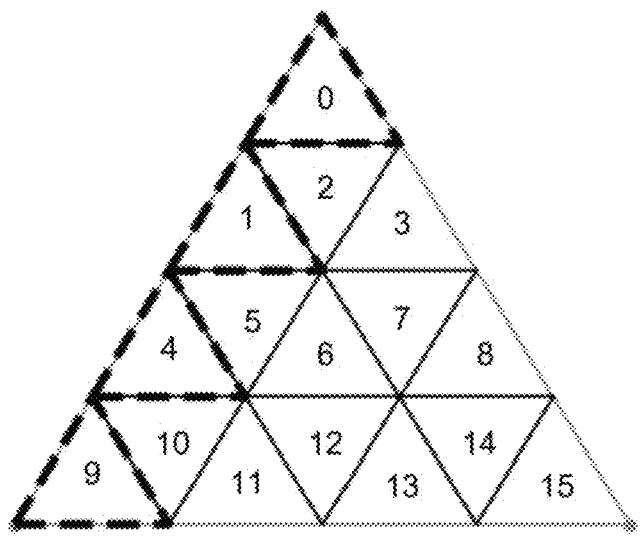
FIG. 8 shows representations illustrating the enumeration of triangle subdivisions, in accordance with an embodiment of the present disclosure.
Figure 8:
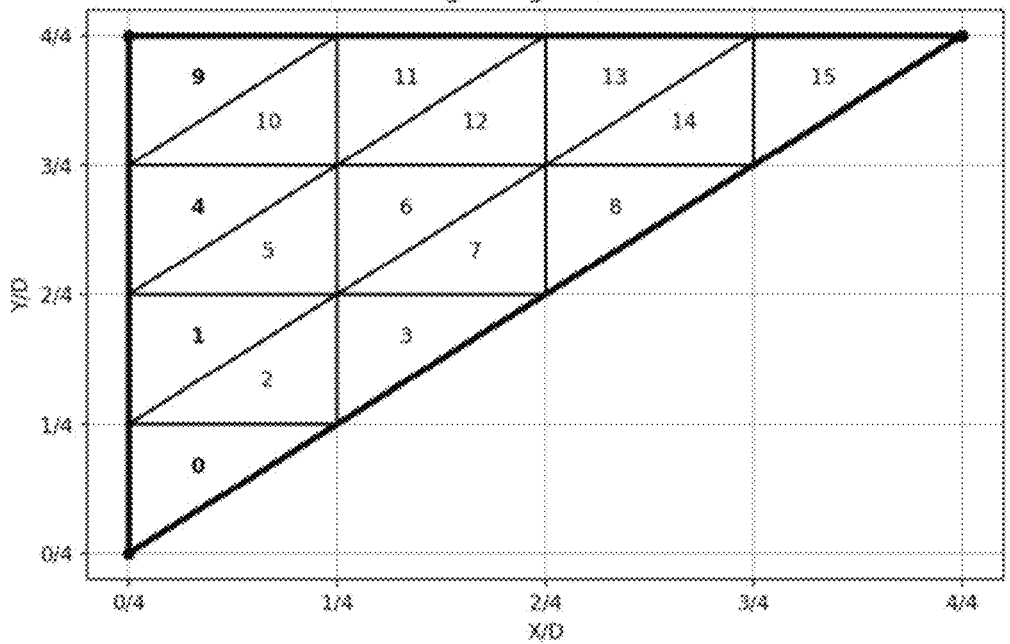

A planar triangle can be subdivided into D 2 equal-area triangles. FIG. 8 shows the division of a triangle 802A that had each edge subdivided by four, i.e., D=4. The triangles along the left edge (with a dashed boundary) follow a squared relationship to the row. The triangle can be transformed into different coordinates while still preserving its equal-area property for each of its subdivisions. FIG. 8 shows coordinate transformation 802B of the same triangle from the triangle 802A but scaled to fit within a box bound between [−1, 1] on each axis.

The index T of the triangle follows below constraints:

$$T = X + Y^2 \quad (2)$$

Where, $$0 \le Y \le D-1 \quad (3)$$

$$0 \le X \le 2 \cdot Y \quad (4)$$

For example, triangle T=12 is on the third row Y=3, third offset X=3 (with counting starting at 0). A point at (x, y) where 0≤y≤1 and 0≤x≤y can be placed on the graph and the triangle that contains it can be identified. The coordinates of the bounding triangle can be then transformed into the unit bounding box, as well as the target coordinate. The process of identifying the bounding triangle can continue in this manner, recursively, for as many steps as desired. The index of the bounding triangle can be computed. The row is the floor operator on n, hence:

$$Y = \min(\lfloor y \rfloor, D-1) \quad (5)$$

The minimum operator is for handling the boundary case where, y=1, which is considered the third row. The value for X is a bit more involved, as it requires identifying if it is the upper or lower triangle in a particular row. Upper triangles have even-valued X, and lower have odd-valued X.

The diagonals of the unit-box triangle have a slope of 1, meaning the decision for being in the lower triangle is:

$$y < x + (Y-B) \quad (6)$$

where $B = \lfloor (x \cdot D) \rfloor$. The computation for X then involves:

$$X_0 = 2 \cdot B + \begin{cases} 1 & \text{if } y < x + (Y - B) \\ 0 & \text{otherwise} \end{cases} \quad (7)$$

$$X = \min(X_0, 2 \cdot Y) \quad (8)$$

with the final minimum to ensure points along the right-most boundary are never considered lower triangles when they belong to the upper triangle. In an embodiment, this can occur with finite-precision arithmetic.

In an embodiment, the 3 bits representing the starting triangle can be mapped to the earth in many ways. One useful way is to assign geographical meaning to the bit positions:

|       | 0     | 1     |
|-------|-------|-------|
| $b_0$ | North | South |
| $b_1$ | East  | West  |
| $b_2$ | Close | Far   |

The leading bit ($b_0$) decides South/North (high if lat < 0)
The second bit ($b_1$) decides West/East (high if longitude < 0)
The third bit ($b_2$) decides Far/Close (high if |longitude| >= 90)

For mapping relative latitude/longitude to position on a planar Triangle, non-equal area triangular subdivision may be considered. A planar triangle like the one shown in FIG. 8 may be considered where it is a right triangle with its right angle at (x, y)=(0, 1).

Mapping these square-like latitude/longitude positions into a triangle can be done with one or more techniques known to a person skilled in the art. One of the techniques includes considering triangles with non-equal areas, with below values.

$$y = 1 - (rlat/90) \quad (9)$$

$$x = y * (rlon/90) \quad (10)$$

Such a technique keeps the poles of the earth as points.

A method to ensure equal area for the sub-triangles i.e., modified Collignon projection may include the computations, as shown below $$\Theta = \pi * \frac{(90 - rlat)}{180} \quad (11)$$

$$y = \sqrt{(1 - \cos(\theta))} \quad (12)$$

$$x = y * \frac{rlon}{90} \quad (13)$$

These are invertible transforms for converting (x, y) on a triangle to (rlon, rlat) on a ⅛th octant of the Earth. In this transformation, lines of latitude and longitude remain straight. Other mappings may ensure straight lines on the triangle which are great circles on the sphere. Lines of latitude are not great circles and would then be curved in such a projection.

Further, bounding triangles are iteratively selected for a particular position. Once the (x, y) position is known, the index of the bounding triangle may be computed. It may be done in one step, if D=221, which can represent 242 sub-triangles. If instead D=2, then each step of identifying the bounding triangle produces one of four index values: 0<T<3, which is also represented using 2 bits. Iteratively proceeding allows for variable resolution, much like having more digits after a decimal point increases precision, and so does having more bits. In general, each step can identify $D^2$ triangles, so if D=3, then trinary can be used.

When translating the index to bits, it is useful to reorder the encoding:

| index | bits |
|-------|------|
| 0     | 01   |
| 1     | 10   |
| 2     | 00   |
| 3     | 11   |

In this way, trailing zeros in the bitstream map to the centre triangle does not change the centre point of the bounding triangle. Like decimal numbers, trailing zeros do not change their value. That is a property that system 100 must have as well.

Bit Stream and Resolution

The initial triangle of the octahedron is encoded as 3 bits. Iterating 21 steps with D=2 creates 42 more bits. In a preferred embodiment, each triangle is encoded as 45-bit-stream.

The number of bits improves the resolution.
 15 bits: ~71000 meters
 25 bits: ~2200 meters
 35 bits: ~68 meters
 45 bits: ~2.1 meters
 55 bits: ~0.064 meters
 65 bits: ~0.0021 meters
Every ten bits improves the resolution by a factor of 32.

At block 210, the bit-sequence representation module 108 may generate an n-bit binary representation for each of the triangles/quadrilaterals projected on the area of the earth. At block 212, the bit-word mapping module 110 may map or associate each tuple of the n-bit binary sequence to words, symbols, or its combination. The full n-bit binary representation can be mapped to a sequence of words, a sequence of symbols, or a sequence of the combination of words and symbols. In a preferred embodiment, the representation may be 4 words that may uniquely identify any triangle/quadrilateral on earth's surface. In another embodiment, the 45 bits may be represented as a group of 5 words, where each word uniquely maps to 9 bits. The first few words may be omitted and the system 100 can still achieve accurate location identification when the 4 words are combined with geographical constraint/context. The sequence of 9 bits may be mapped to a set of 512 simple English words. The 45 bits used in the proposed system give a resolution, on average, of 7 ft to the nearest centre of a quadrilateral. With 5 words, a unique location on the planet may be located. Consider an example "point.beam.front.context.cube" maps to the Texas Capitol's center entrance. The points below illustrate the accuracy of location information for each subsequent word.

4 words—the nearest location occurs ~450 miles away.
3 words—the nearest location ~25 miles away.
2 words—the nearest location ~1.0 miles away.
1 word—the nearest is about 250 ft away.

As one may appreciate, the side-balanced bisection search is important for maintaining a large separation between word repetitions. If regular bisection search were used, the nearest 2-word repetition would be only 0.5 miles away along the unbalanced boundary instead of 1.0 mile away on average.

Figure 9:
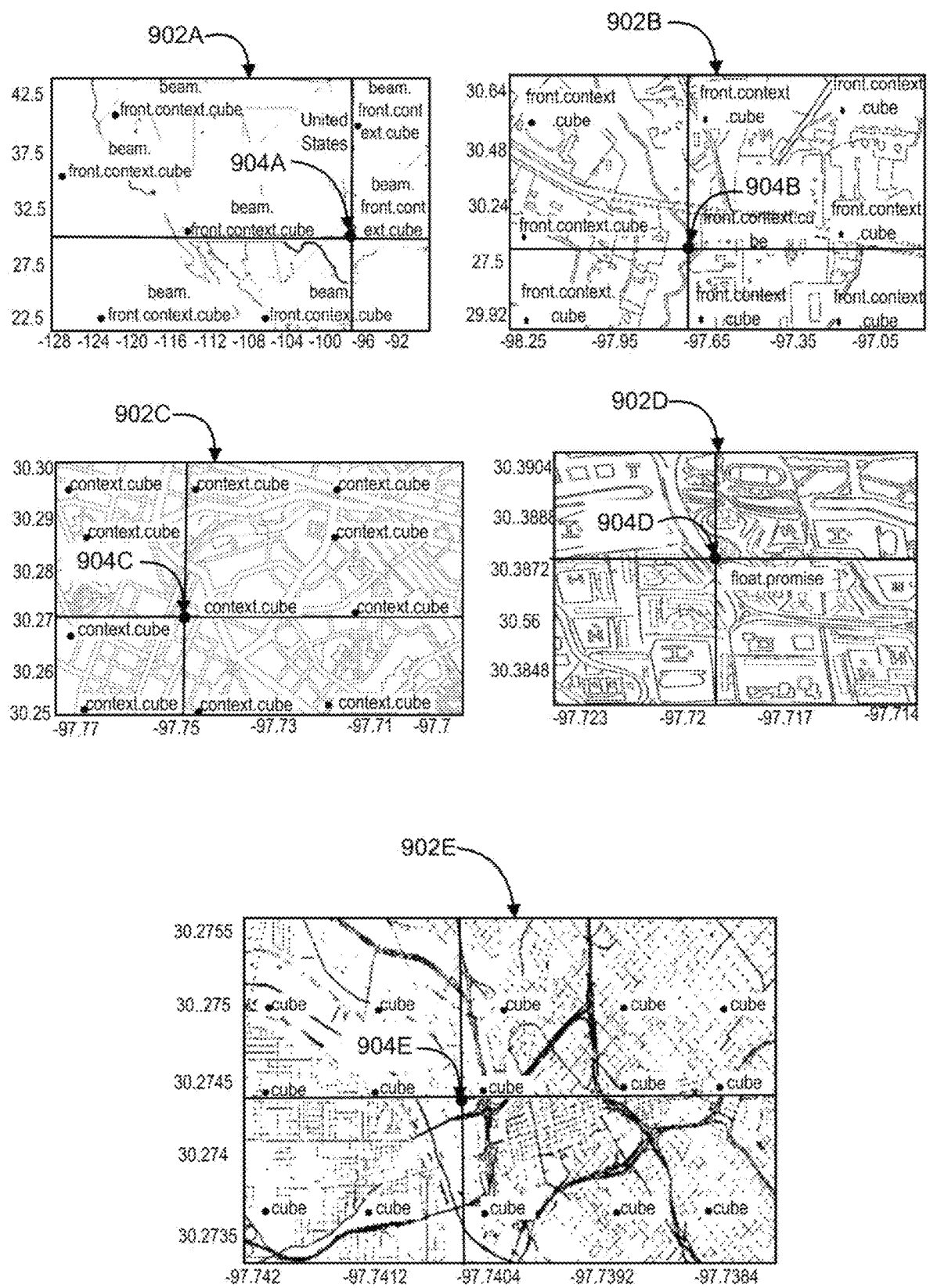
FIG. 9 shows map location with representations having 4 words, 3 words, 2 words, and 1 word on a map, in accordance with an embodiment of the present disclosure.

FIG. 9 shows the locations of representations on a map. Map 902A shows location 904A with a 4-words representation as "beam.front.context.cube". The representation repeats on the map roughly every 450 miles. Map 902B shows location 904B with 3-words representation as "front..context.cube". The representation repeats on the map roughly every 25 miles. For many practical purposes, using just three words is sufficient to navigate an area. Map 902C shows a location 904C with a 2-words representation as "context.cube". The representation repeats on the map roughly every 1.2 miles at a latitude. Two words may be sufficient for uniquely locating a position in a park, like a food court or an exit point. Another example of two words representation is shown on map 902D with a location 904D having a 2-words representation as "float.promise". A person can call their Uber driver and tell them via voice or text that they are at "float promise" and the driver now knows their exact position, to within 7 ft. Map 902E shows a location 904E with representation as "cube". The representation repeats on the map roughly every 250 feet and may be useful for identifying an entrance to a smaller building.

The bit string of length 45 can be subdivided into 9 groups of 5 bits, which maps directly to a Base32 encoding, such as Crockford's Base32, which strikes a good balance for encoding data and being human-readable, type-able, and speakable. The bit stream: '011 11 01 11 00 11 01 11 11 00 11 01 01 00 01 11 10 10 00 10 10 00' can be expressed using Crockford's Base32 encoding as: 'fed.yd8.yh8', which can be spoken using NATO phonetics as:

'foxtrot echo delta. yankee delta eight. yankee hotel eight' and it corresponds to the Stevie Ray Vaughn Statue in Austin, Texas. At 30.26354, −97.74979.

For using four words to encode 45 bits, the group of 45 bits does not evenly divide into 4 groups. Thus, the base can be changed and an encoding that is slightly larger than $2^{45}$ is created. This requires N words, such that:

$$N^4 \geq 2^{45} \quad (14)$$

$$N \geq 2436 \quad (15)$$

Figure 10:
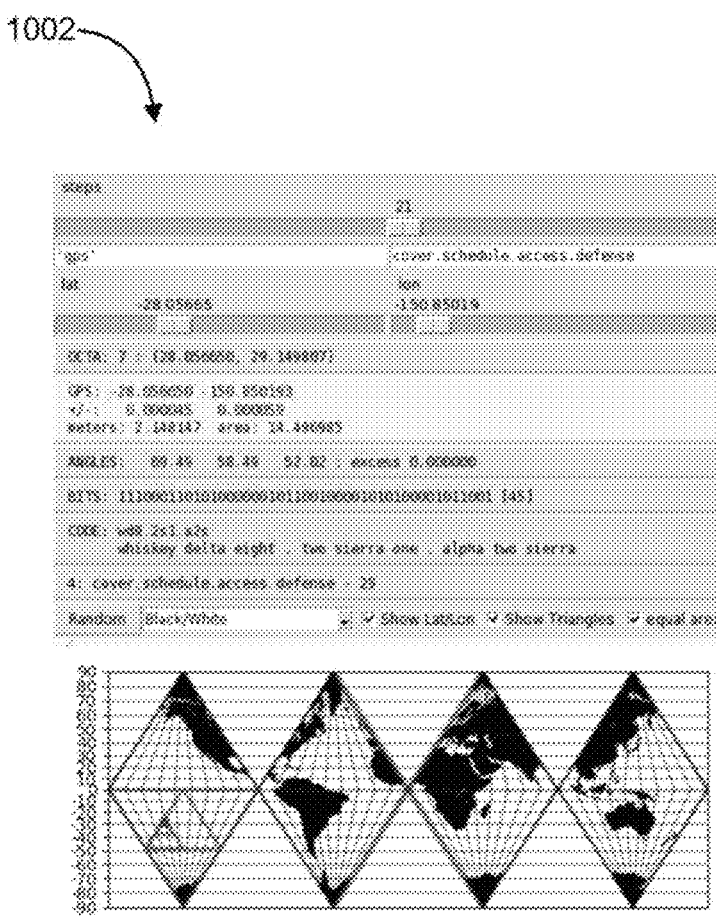

An exemplary embodiment of generating the representation is illustrated in FIG. 10. The dictionary must have at least 2436 words to be able to have a 1:1 mapping to each possible bitstream. Spoken words may have homophones, where a sequence of phonemes maps to more than one orthography. For example: too, to, two. The dictionary needs to map all homophones to the same number.

There is a nice-to-have optimization in order to avoid displaying the same word twice or more. The ordered list of words can be taken from without replacement. This amounts to a partial but known renumbering of the words. It also requires an additional 3 words to act as "overflow" words in the case the last word of the dictionary is chosen four times in a row.

A parity bit may be added to the bit sequence, which then requires a dictionary of N=2897 words to encode 46 bits. It amounts to an increase of 18.9% (=2897/2436-1) in words, which is still manageable. Now there may be a decode error indicator. The parity bit is an even-odd bit count indicator. Adding two parity bits (now total space is 247) would require 3445 words in the dictionary.

In an embodiment, the dictionary used for generating the representation may not have offensive/profane words. It should not have negative words, such as "sickness, virus, bad, criminal", for describing a location. It was particularly amusing before the restrictions on negative words. The dictionary should also minimize confusable words, where a slight change in vowel maps to a different word, e.g., pen/pin, shall/shell. It should also opt for one and two syllable words. The dictionary may evolve with time. The "retired" words must still map to the original number, though it will not be suggested when generating a phrase for a location. There will necessarily be a many-to-one mapping, which is already needed due to homophones.

A list of rejected words must be maintained as well, to avoid accidentally reintroducing them in the future. However, this list is not needed by the end user. It is an administrative necessity.

Compound words should be handled carefully such that the component words are not confused. For example, "household" is rejected due to having "house" and "hold" in the word list, but "over" is rejected to allow for "overcome", "overlook", "overall", and "oversee" to be in the valid dictionary.

The decoding of the dictionary can be string dependent. The user may provide the string of characters to decode in an input box or as part of the URL for the website. For example, if a certain word or combination of words is present, a different decoding scheme may be chosen, such as using a dictionary that represents a limited geographical area.

For example: acl.music.band or acl21.music.band, can be used to encode a smaller area, such as Zilker Park in Austin, TX. The prefix may trigger a coding scheme that can offset to the latitude/longitude values to maximize the common bit prefix length for the region of interest. As an extreme example, an event that spans across the equator would have no common prefix for the bit sequence, though adding an offset to the latitude can have the region of interest to have a long common prefix. The number of iterations taken by the algorithm may be adjusted in the custom scheme as well, optionally requiring less or more resolution. Another approach would be to translate the latitude/longitude coordinate to (x,y,z) on the unit sphere, rotate the sphere, and then invert the point back to latitude/longitude. Yet another approach can be to remap the individual and blocks of triangles in an area directly to a short bit string, and then encode this shorter bit string which may have parity bits appended. Using the triangle remapping preserves the exact triangle boundaries used for the general 4-word encoding. A latitude/longitude offset will necessarily create overlapping but slightly different boundaries for the custom encoding versus the general encoding. This optional coordinate offset/triangle renumbering can be used for special events, where words not in the standard dictionary may be reserved for a limited time.

In an alternate embodiment, the bit-word mapping module 110 may generate the representation by using the letter "U" as a substitute for some letters. Using the letter "u" to indicate contextual substitution is performed. Here is an example: bad.xxx.kkk becomes bau.xxu.kku using the following substitution table for 3-letters:

| original | Substitute |
|---|---|
| bad | bau |
| xxx | xxu |
| kkk | kku |

The substitution table can use 1 to N characters preceding the u to infer context.

| original | Substitute |
|---|---|
| death | deatu |

The letter "u" is always the last character. This is useful for progressive encoding, where the representation may show less than 9 code characters for a desired surface resolution. If the next character to encode produces a match from the substitution tables, the letter "u" is produced rather than the offending letter.

The substitution may be a forward substitution or a reverse substitution. In the forward substitution, the substitution needs to be invertible. The forward substitution starts with the shortest prefix, replacing all 2-letter codes, then 3 to N. In the reverse substitution, like the forward substitution, when u is encountered, the 2-letter table is checked to identify what u should be, then the 3-letter table, etc. For example, when encountering deatu 1. check for to in the tables (not found)
2. check for atu (not found)
3. check for eatu (not found)
4. check for deatu (found, u becomes h)

The base32 code word to latitude/longitude conversion can still use the original Crockford Base32 encoding. If the "u" is in the string, perform replacements. In an alternate embodiment, the decoding process can reject valid Base32 strings that have not had substitution applied to them by checking if forward substitution changes anything.

In an alternate embodiment, one or more characters outside the selected 32 characters may be used to indicate a substitution. For example, symbols such as "=", "+", "/", "*", "-", and so on may be used as the substitute.

At block 216, the location information generation module 112 generates location information using the representation generated for the location. In an embodiment, location information generated by the location information generation module 112 may include the representation/code name of the location. In an alternate embodiment, the representation may be embedded with latitude/longitude coordinates. In an alternate embodiment, the location information may be provided to the user along with additional data/information. In an embodiment, a custom map may be overlayed onto the existing map for a special event, detailing locations of bathrooms, stages, medical, etc. In addition to showing this different dictionary-to-location, the equivalent full 4-word dictionary decoding is also displayed. When a special dictionary word/representation is about to expire and no longer be decoded, a message is displayed to the user telling them to rely on the generic 4-word encoding of the same location. The expiration time may be displayed to the user for the special decoding scheme.

For example:

*acl*.music.band(valid for 3 more weeks)

Expiration notices may also apply to words from the always-available dictionary, letting the user know to use the newer mapping, though the older mapping still works.

A separate dictionary, in principle, can contain all possible 3 "XXX" words from the Base32 code word (215 "words"), which causes the decoder to switch from the 4-word to the code-word system.

In an embodiment, the local information generation module 112 first translates the written word to its sequence of possible phonemes, and then maps the phonemes to a set of words, which then map to the bitstream, as part of the decode path. These can be suggestions for the user to correct the mis-transcription. The encode path would still be word-to-number. The phoneme confusability suggestions aim to correct errors in the acoustics. Also, typing-error handling is implemented where the nearest word to what is typed can be shown. Easter-egg phrases may also be implemented in the system 100. For example, "words.to-.the.world" can map to a surprise location, even though "to" and "the" are not part of the dictionary.

FIG. 10 shows a prototype screenshot 1002 of a graphical user interface representing the different mapping of location information generated the system 100 with other existing location reference methods. Sliders can adjust the latitude/longitude positions over the surface of the Earth [−90, 90], [−180, 180]. The triangle of the octahedron and its relative coordinates are also shown in screenshot 1002. The point is the southern hemisphere, far west, hence it is the "7th" OCTA. The angles of the bounding triangle are given, as well as its spherical excess, which is practically zero at this scale (making the planar approximation of all angles summing to 180 valid).

The computed bitstream is shown with 45 bits (3 octa bits+2*21 step bits). The nine-symbol code word is displayed, along with its NATO phonetics. Using just 9 characters, a location can be represented within 3 meters.

In an embodiment, the bit-word mapping module 110 may further perform error correction when generating the representation. If the bitstream does not have any redundancy, e.g., a checksum or error-correcting bits, the bit-word mapping module 110 may add a checksum or error-correcting bits to the bitstream, either as a prefix, a suffix, or an insert within the bitstream. For example, Hamming Codes or Reed Solomon Codes may be used. A special error correction number or word may be appended to the end of a sequence.

Additionally, if the approximate location is known, say the first N bits of the bitstream, this information greatly reduces the possible choices of words for the representation. This can help identify possible word confusions that were transcribed by emergency response personnel due to a bad acoustic communication channel. The dictionary can be augmented with its DARPABET or International Phonetic Alphabet (IPA) transcription, which represented the actual phonemes used for saying a word. For example, a /k/ to /g/confusion may occur, where "coal" is heard as "goal". Meaningful suggestions to mis-transcriptions can be realized using both known confusion models as well as approximate location.

In some embodiments, the bitstream may be encrypted using a pre-shared key. For example, an agreed phrase may be used to generate a bitstream that is used to XOR the message bitstream, and then a publicly shared location information may need the encryption key phrase to decode to the correct position. Without it, the phrase/bitstream would decode to the wrong position on the planet. The encryption phrase is like a one-time-pad, if it is only used once.

In another embodiment, "scramble" the slogan is used to a fixed offset, where a different representation or Code name can be used to derive a latitude/longitude which is then added/subtracted from the current generated representation's latitude/longitude (with proper support for wrapping around +/180 and +/−90).

In an embodiment, the altitude may be encoded optionally as an appended string. It is simplest to encode the meters directly as a '+100 m' for example. This added string has no effect on encoding/decoding. It may be ignored. For example, consider representation: hello.every.person.here+100 m In another embodiment, the latitude/longitude coordinates may be quantized to an underlying grid and then each element is represented using a unique combination of symbols or words. The sequence of bits generated by this system can be 1:1 mapped to a sequence of English words. For example: "beam.red.tip" may be a sequence of words that represent a bounded polygon on the surface of the planet. The word beam may cause confusion with bean or bin. Each of the words in the dictionary can be assigned a number 0-9 and chosen to satisfy those words in a word confusion group have a different number. This condition may not always be satisfied but can be for a majority of confusions.

beam-2 red-1 tip-8 so that the displayed word sequence can be "beam.red.tip.218"

When the words and check numbers are displayed to the user, the display can render the numbers below or above its corresponding word, or as a subscript/superscript. For example:

beam·red·Xp

218

The 218 is the augmented, redundant check on the words. The word bean and bin would be assigned different numbers. When the use inputs these extra numbers, the search results incorporate this extra redundant information to filter out non-matches. If the user entered bin.red.tip.218, the search results would then return beam.red.tip as a possible correction. The selection of related words relates to the edit distance of the word. The edit distance is the number of characters that can be added, deleted, or changed to make one word into another word. It is also known as the Levenshtein distance3. The edit distance can be applied to the word itself or to its phonetic representation. One or more techniques known to a person skilled in the art may be used to represent the International Phonetic Alphabet for common English phonemes using ASCII. For example:

beam:bim bean:bin bin:bin red:rEd tip:tlp

Each word in the dictionary has its phonetic representation. The phonetic edit distance between words can be used to rank order confusions.

In another example consider phrase "apple green computer" which could have "361" as its checknumber. If "apple" is not 3, then an error has occurred. A suggestion of words that are closely pronounced to "apple" that are assigned the number 3 can be presented. Ranking the pronunciation closeness may be done using an edit distance on the words' phonetic encoding, in one embodiment. Rather than giving "361", additional mathematics can be performed to reduce the spoken or written size of the check number at the expense of expanding the set of possible corrections. In an embodiment, the sum of the numbers can be reported instead, so 3+6+1=10. apple=3, green=6, and computer=1, then the checksum works. If the person confused "green (6)" with "grin (7)", then the provided checksum of 10 does not match the word checksum of 11 (=3+7+1). A list of correction words needs to be provided. Using a pre-computed list of common confusions for a word, the set of all checksums can be computed, and the ones matching 10 can be presented. The list may be sorted based on phonetic edit distance. This list may become exponentially large, which may require some clever reduction approximations.

The check numbers themselves can be mapped to words, to provide a check word. The mapping of words to numbers should maximize the phonetic distance. For example, if both "green" and "grin" were 6, then the check number does not help correct the error. The set of all words mapped to a particular number needs to have its internal phonetic edit distance as large as possible. In the instant system, for hierarchical word systems, more weighting can be given to the precision words (the last two words) rather than the regional words (the first two words). For example, "big river fast bird" can have numbers assigned to the words, giving a checksum of 1234. It can be reduced to two digits, where the even/odd of the check number encodes redundancy about the first two words, and the rest of the number encodes redundancy about the last two words.

Figure 11:
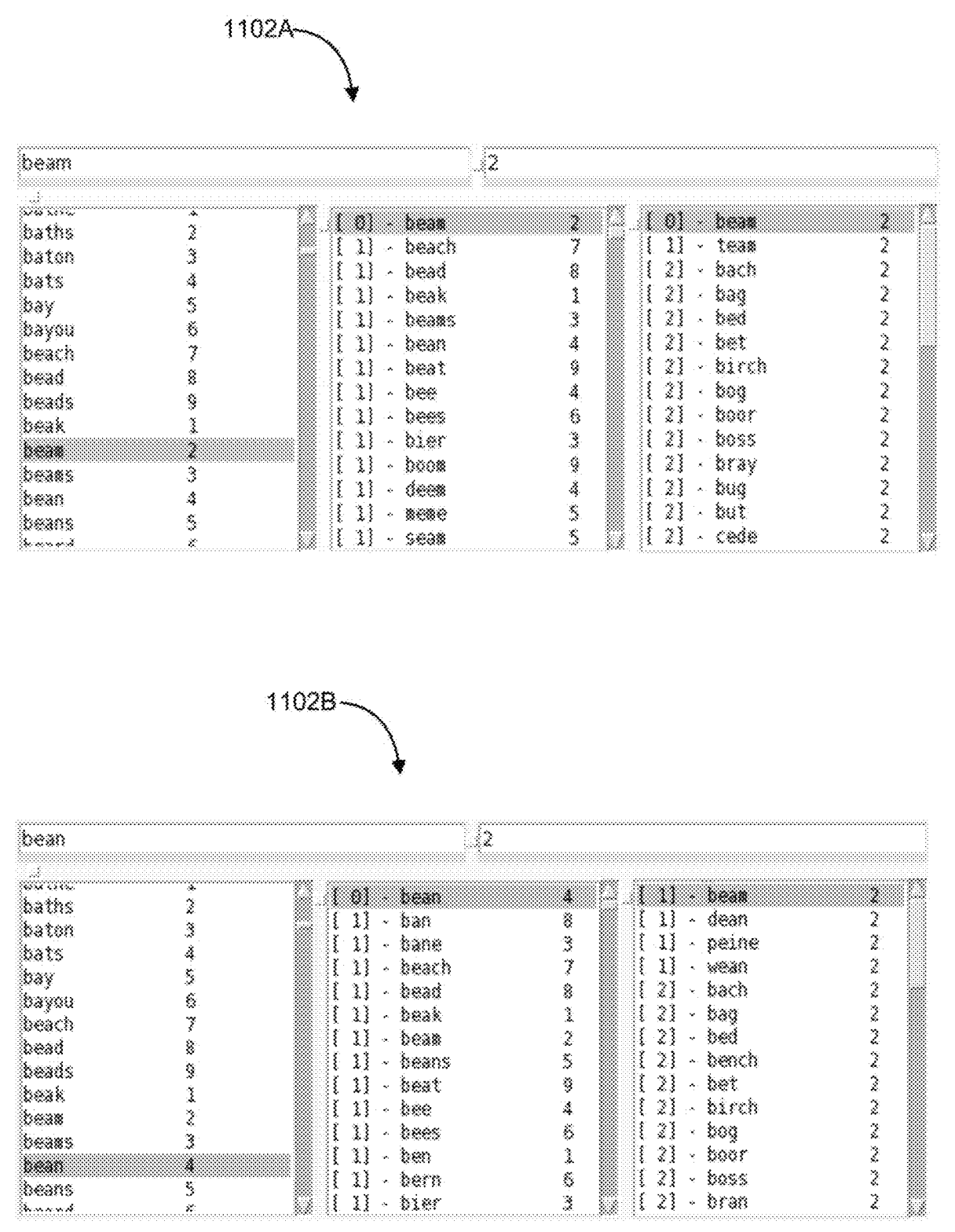

Screenshot 1102A in FIG. 11 shows three columns:
1. The list of words and their associated numbers.
2. The rank-ordered phonetic edit distance [in brackets] to the selected word beam.
3. The filtered version of column 2 where the word has associated the number If the user heard bean instead, but still used 2, the results would be as shown in screenshot 1102B in FIG. 11. Notice that the first result in column 3 is the correct word beam.

In an alternate implementation, the number of words can be expanded to 4 or more, and the numbers may be constrained between [1-5]. For example, the numbers may be a "checksum" of multiple numbers to have fewer digits. For example, two numbers can be reduced to a single number by $$n_{01}=3n_1+n_0 \bmod 10 \tag{16}$$

This can be interpreted as a pair of words that must satisfy a certain number.

Rather than using an augmented number, words could be used. In the case of three words, using [0-9] for each word then requires 10³=1000 words in the check word dictionary. The number 218 might map to predict. The checksum word is substituted with its equivalent number and then used to correct errors with the prior three words. The check word itself may become confused with another word. A set of common confusions for each check word may be used to compute the set of possible checksums. For four words, the four check numbers [0000-9999] can be condensed to 2 numbers [00-99], which can then be mapped to one of 100 words.

Figure 12:
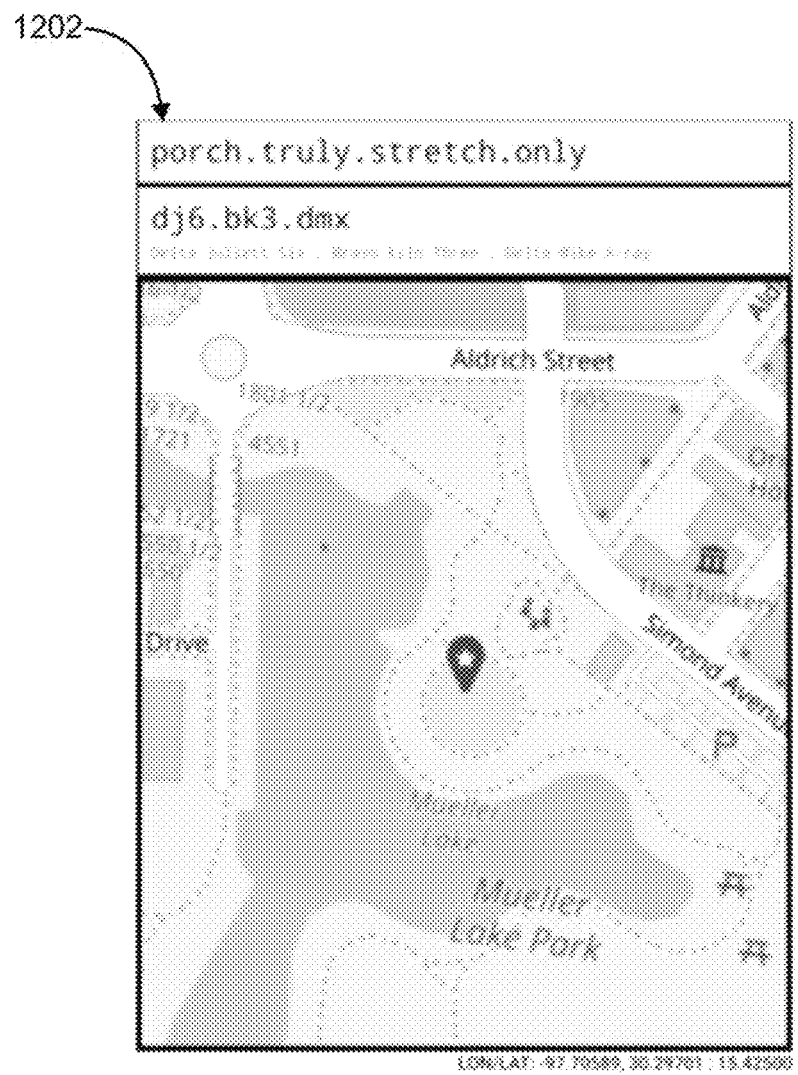

In an embodiment, the location information may include the representation along with the number of characters it contains (Periods included). The map shows a series of smaller highlighted triangles in the lower left, which shows the iterative selection of the bounding triangle. FIG. 12 shows a screenshot 1202 of a web-browser-hosted version of the system 100 which is operating on a mobile phone. The centre marker indicates the centre of the triangle. Panning the map adjusts the latitude/longitude, and thus the representation changes as well as the code word.

Local Word Search Results

Given the hierarchical nature of the bisection search, and the locality of a number of words, a person can search for the last 1, 2, 3 or 4 words, and when combined with the user's location (or a given centre location), the surrounding neighbours may also be given. The context of location can be used to eliminate the need for the first one or two words for many practical navigation problems in a geographical location. The search shows where on a map the repeating words occur. It may only be a smaller set of immediate neighbouring points.

Figure 13:
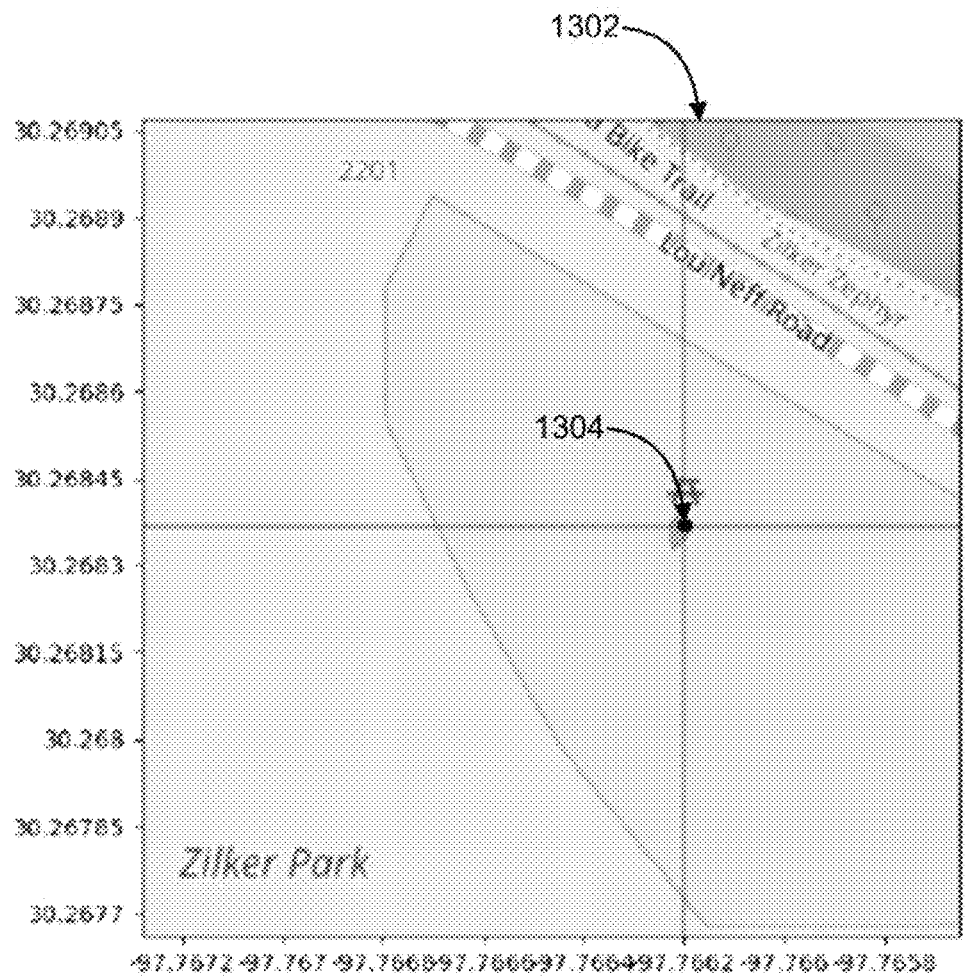

Omitting the first word has 512 repetitions. Omitting the first two words has $512^2$=262, 144 repetitions globally. Three words: 134, 217, 728 repetitions globally. Using a limiting boundary constrains the number of search results returned. The location word search can suggest corrections if the provided character string is not found in the dictionary or provide common misspellings that are also in the dictionary. The location search can also be combined with actual local geocoding terms, e.g., park names, etc. A user could ask for "zilker justice star", the search terms can look for proper names using a separate geocoding search system to localize "Zilker Park", and then highlight where "justice star" occurs. FIG. 13 shows an example map 1302 of location 1304 with representation "zilker justice star" having Zilker found as "Zilker Park" and the nearest "justice star" highlighted. Multiple separate geocoding systems may be combined to identify the provided location. For example, a proper terms dictionary or special words for events can be reserved to create context for a location. In another embodiment, "Zilker" may be a word in another dictionary which is then substituted with "point.beam.curl".

Figure 14:
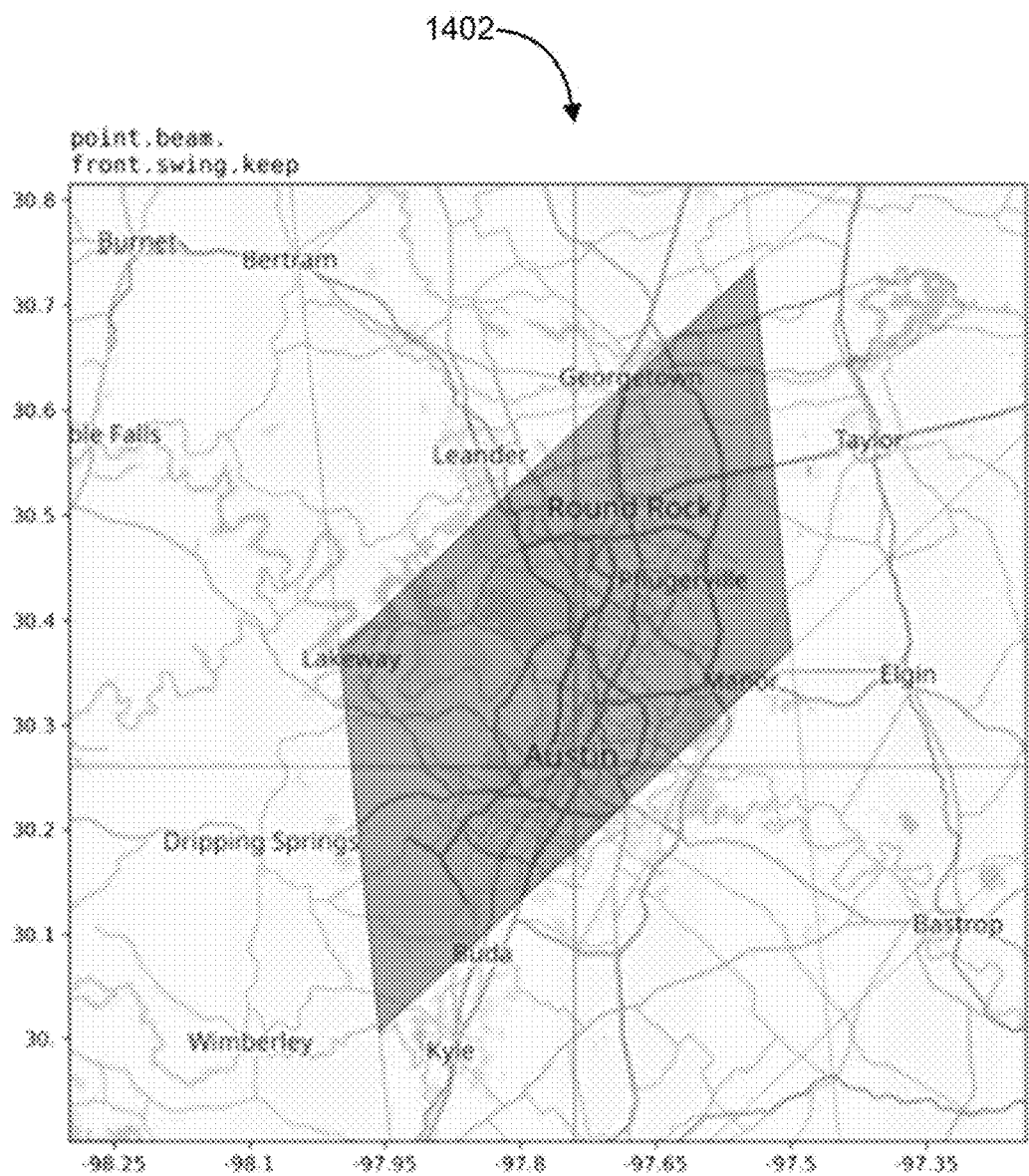
Figure 15:
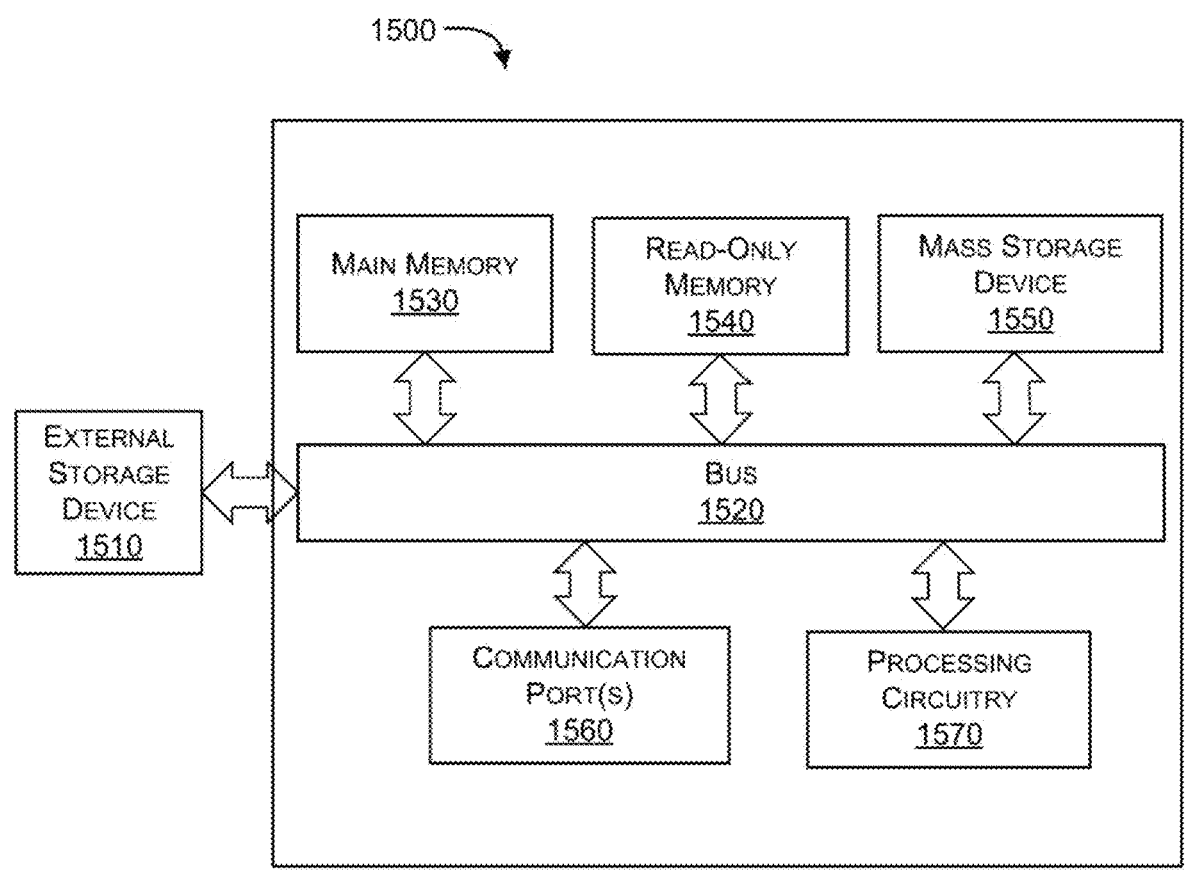
FIG. 15 illustrates an exemplary computer unit in which or with which embodiments of the present disclosure may be utilized.

In an embodiment, a representation for a location may be prefixed with "@/" or "./". For example, @/front.context-.cube or ./front.context.cube can be used as a three-word location, when local context is known to infer the missing first 2 words. The number of words after the "@/" can be 1, 2, 3, 4, or, 5. By default the words represent the last words, omitting the leading words. If instead the broader area were needed, append a "/," so "@/point.beam/" would show the diamond in FIG. 14. FIG. 15 illustrates an exemplary computer system in which or with which embodiments of the present disclosure may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 15, the computer system 1500 includes an external storage device 1510, bus 1520, main memory 1530, read-only memory 1540, mass storage device 1550, communication port(s) 1560, and processing circuitry 1570.

Those skilled in the art will appreciate that the computer system 1500 may include more than one processing circuitry 1570 and one or more communication ports 1560. The processing circuitry 1570 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 1570 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 1570 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 1570 may include various modules associated with embodiments of the present disclosure.

The communication port 1560 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 1560 may be any RS-232 port for use with a modem-based dialup connection, a 10/100 Ethernet port, a Gigabit, or a 10 Gigabit port using copper or fiber, a serial port, a parallel port, or other existing or future ports. The communication port 1560 may be chosen depending on a network, such as a Local Area Network (LAN), Wide Area Network (WAN), or any network to which the computer system 1500 may be connected.

The main memory 1530 may include Random Access Memory (RAM) or any other dynamic storage device commonly known in the art. Read-only memory (ROM) 1540 may be any static storage device(s), e.g., but not limited to, a Programmable Read-Only Memory (PROM) chips for storing static information, e.g., start-up or BIOS instructions for the processing circuitry 1570.

The mass storage device 1550 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 1530. The mass storage device 1550 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 1520 communicatively couples the processing circuitry 1570 with the other memory, storage, and communication blocks. The bus 1520 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 1570 to the software system.

Optionally, operator and administrative interfaces, e.g., a display, keyboard, and a cursor control device, may also be coupled to the bus 1520 to support direct operator interaction with the computer system 1500. Other operator and administrative interfaces may be provided through network connections connected through the communication port(s) 1560. The external storage device 1510 may be any kind of external hard drives, floppy drives, IOMEGA® Zip Drives, Compact Disc—Read-Only Memory (CD-ROM), Compact Disc—Re-Writable (CD-RW), Digital Video Disk—Read Only Memory (DVD-ROM). The components described above are meant only to exemplify various possibilities. In no way should the aforementioned exemplary computer system limit the scope of the present disclosure.

The computer system 1500 may be accessed through a user interface. The user interface application may be implemented using any suitable architecture. For example, it may be a stand-alone application wholly implemented on the computer system 1500. The user interfaces application and/or any instructions for performing any of the embodiments discussed herein may be encoded on computer-readable media. Computer-readable media includes any media capable of storing data. In some embodiments, the user interface application is a client-server-based application. Data for use by a thick or thin client implemented on electronic device computer system 1500 is retrieved on-demand by issuing requests to a server remote to the computer system 1500. For example, computer system 1500 may receive inputs from the user via an input interface and transmit those inputs to the remote server for processing and generating the corresponding outputs. The generated output is then transmitted to the computer system 1500 for presentation to the user.

While embodiments of the present disclosure have been illustrated and described, it will be clear that the disclosure is not limited to these embodiments only. Numerous modifications, changes, variations, substitutions, and equivalents, will be apparent to those skilled in the art without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

I claim:

1. A computer-implemented method for creating uniquely identifiable location information of an area on the earth, the computer-implemented method comprising:
   creating, at one or more computing devices, an octahedron representation of a sphere-shaped map of the earth;
   converting the octahedron representation of the sphere-shaped map of the earth into a set of triangles in a two-dimensional (2D) plane, wherein the set of triangles comprises a first subset of triangles and a second subset of triangles, wherein a first vertex indicating a top triangle of the first subset of triangles represents the northernmost point of the earth, a second vertex indicating a top triangle of the second subset of triangles represents the southernmost point of the earth and one line of each of triangle of the set of triangles is along the equator;
   skewing the set of triangles clockwise to form a plurality of 2D parallelograms, wherein the first vertex of the first subset of triangles is skewed toward the east and the second vertex of the second subset of triangles is skewed toward the west;
   subdividing areas of the plurality of 2D parallelograms recursively into $2^n$ area subdivisions by sub-dividing along either vertical or horizontal directions and altering the dimension at each recursive step, wherein the $2^n$ area subdivisions are created by selectively performing either a vertical subdivision or a horizontal subdivision twice in succession depending on a relative position of a subdivision from a decision boundary, followed by its complement twice to overcome potential side-imbalance, wherein the decision boundary is a diagonal line across each of the plurality of 2D parallelograms;
   representing each of the $2^n$ area subdivisions as an n-bit sequence, wherein each bit of the n-bit sequence represents the direction of alternating horizontal and vertical subdivision;
   splitting each of the n-bit sequence representations of each of the $2^n$ area subdivisions into a plurality of tuples, wherein each of the plurality of tuples is m-bit of the n-bit sequence;
   associating a commonly used word with each of the plurality of tuples, wherein the commonly used word is selected from a set of $2^n$ preconfigured words;
   storing, in a memory connected with the one or more computing devices, the commonly used word associated with the respective tuple of the plurality of tuples;
   creating the uniquely identifiable location information in the form combination of two or more words comprising the associated commonly used word; and
   enabling the area of the earth to be searched using the uniquely identifiable location information in combination with context information to locate an area of the earth.

2. The computer-implemented method of claim 1, wherein the vertical subdivision is performed twice in succession when a subdivision from a previous step is above the decision boundary and above a horizontal line across the equator, and horizontal subdivision is performed twice in success when a subdivision from a previous step is below the horizontal line.

3. The computer-implemented method of claim 1, wherein the commonly used word to be associated with each of the plurality of tuples is selected from commonly used words in the area.

4. The computer-implemented method of claim 1, wherein the n in the $2^n$ preconfigured words is an integer number selected from a group of numbers comprising 4, 5, 6, 7, 8, 9, 10, 11 and 12.

5. The computer-implemented method of claim 1, wherein the commonly used word is selected using an edit distance metric.

6. The computer-implemented method of claim 1, further comprises steps of converting the n-bit sequence into one or more numerical bases such that either three, four, five, or six words uniquely map to the n-bit sequence.

7. The computer-implemented method of claim 1, wherein the $2^n$ area divisions are created in form of triangles or quadrilaterals.

8. The computer-implemented method of claim 1, wherein each of the two or more words of the uniquely identifiable information is separated by a special character and one or more extra characters comprising a number, letter, and symbol is used to enable spacing between words.

9. A system for creating uniquely identifiable location information of an area on the earth, the system comprising:
   a projection module, configured at one or more computing devices, to
      create an octahedron representation of a sphere-shaped map of the earth;
      convert the octahedron representation of the sphere-shaped map of the earth into a set of triangles in a two-dimensional (2D) plane, wherein the set of triangles comprises a first subset of triangles and a second subset of triangles, wherein a first vertex indicating a top triangle of the first subset of triangles represents the northernmost point of the earth, a second vertex indicating a top triangle of the second subset of triangles represents the southernmost point of the earth and one line of each of triangle of the set of triangles is along the equator; and
      skew the set of triangles clockwise to form a plurality of 2D parallelograms, wherein the first vertex of the first subset of triangles is skewed toward the east and the second vertex of the second subset of triangles is skewed toward the west;
   a subdivisional module, configured at the one or more computing devices, to subdivide areas of the plurality of 2D parallelograms recursively into $2^n$ area subdivisions by sub-dividing along either vertical or horizontal directions and altering the dimension at each recursive step, wherein the $2^n$ area subdivisions are created by selectively performing either a vertical subdivision or a horizontal subdivision twice in succession depending on a relative position of a subdivision from a decision boundary, followed by its complement twice to overcome potential side-imbalance, wherein the decision boundary is a diagonal line across each of the plurality of 2D parallelograms;

a bit sequence representation module to represent each of the $2^n$ area subdivisions as an n-bit sequence, wherein each bit of the n-bit sequence represents the direction of alternating horizontal and vertical subdivision;

a bits-word mapping module to
   split each of the n-bit sequence representations of each of the $2^n$ area subdivisions into a plurality of tuples, wherein each of the plurality of tuples is m-bit of the n-bit sequence; and
   associate a commonly used word with each of the plurality of tuples, wherein the commonly used word is selected from a set of $2^m$ preconfigured words;
   storing, in a memory connected with the one or more computing devices, the commonly used word associated with the respective tuple of the plurality of tuples; and a location information generation module to
   create the uniquely identifiable location information in the form combination of two or more words comprising the associated commonly used word, wherein the uniquely identifiable location information in combination with context information is used to enable the area of the earth to be searched by a user through a user device.

10. The system of claim 9, wherein the vertical subdivision is performed twice in succession when a subdivision from a previous step is above the decision boundary and above a horizontal line across the equator, and horizontal subdivision is performed twice in success when a subdivision from a previous step is below the horizontal line.

11. The system of claim 9, wherein the commonly used word to be associated with each of the plurality of tuples is selected from commonly used words in the area.

12. The system of claim 9, wherein the n in the $2^n$ preconfigured words is an integer number selected from a group of numbers comprising 4, 5, 6, 7, 8, 9, 10, 11 and 12.

13. The system of claim 9, wherein the commonly used word is selected using an edit distance metric.

14. The system of claim 9, the n-bit sequence is converted into one or more numerical bases such that either three, four, five, or six words uniquely map to the n-bit sequence.

15. The system of claim 9, wherein the $2^n$ area divisions are created in form of triangles or quadrilaterals.

16. The system of claim 9, wherein each of the two or more words of the uniquely identifiable information is separated by a special character, and one or more extra characters comprising a number, letter, and symbol is used to enable spacing between words.

* * * * *